United States Patent
Aruga et al.

(10) Patent No.: US 10,042,344 B2
(45) Date of Patent: Aug. 7, 2018

(54) ELECTRIC APPARATUS, ELECTRIC APPARATUS CONTROLLING METHOD, AND RECORDING MEDIUM

(71) Applicants: Ryoh Aruga, Kanagawa (JP); Daisuke Sakai, Tokyo (JP); Atsushi Saitoh, Kanagawa (JP)

(72) Inventors: Ryoh Aruga, Kanagawa (JP); Daisuke Sakai, Tokyo (JP); Atsushi Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/491,310

(22) Filed: Apr. 19, 2017

(65) Prior Publication Data
US 2017/0336769 A1 Nov. 23, 2017

(30) Foreign Application Priority Data

May 17, 2016 (JP) .................................. 2016-099061

(51) Int. Cl.
*H05B 37/02* (2006.01)
*G05B 19/042* (2006.01)
(Continued)

(52) U.S. Cl.
CPC ....... *G05B 19/042* (2013.01); *H05B 33/0854* (2013.01); *H05B 37/0272* (2013.01);
(Continued)

(58) Field of Classification Search
CPC .......... G05B 19/042; G05B 2219/2642; H05B 33/0854; H05B 37/0272; H05B 37/0281; H04W 84/12
(Continued)

(56) References Cited

U.S. PATENT DOCUMENTS 8,450,670 B2 * 5/2013 Verfuerth ........... H05B 37/0272
250/205
8,476,565 B2 * 7/2013 Verfuerth ........... H05B 37/0272
250/205
(Continued)

FOREIGN PATENT DOCUMENTS

JP 2002-259240 9/2002
JP 2015-115698 6/2015

*Primary Examiner* — Daniel D Chang
(74) *Attorney, Agent, or Firm* — Oblon, McClelland, Maier & Neustadt, L.L.P.

(57) ABSTRACT

An electric apparatus includes an electric device that performs operation using electric power being supplied, a receiver that receives one or more control commands for controlling the electric device from a server through a network, a memory that stores control command history information including a content of one or more control commands that are previously received from the server, and circuitry that determines whether or not a control command is received from the server for a predetermined period of time, generates, if the control command is not received from the server for a predetermined period of time, other control command using the content stored in the control command history information, and controls, if the control command is not received from the server for the predetermined period of time, the electric device based on the other control command being generated.

8 Claims, 31 Drawing Sheets

(51) Int. Cl.
  *H05B 33/08* (2006.01)
  *H04W 84/12* (2009.01)
(52) U.S. Cl.
  CPC . *H05B 37/0281* (2013.01); *G05B 2219/2642* (2013.01); *H04W 84/12* (2013.01)
(58) Field of Classification Search
  USPC ........................................................ 315/151
  See application file for complete search history.

(56) References Cited

U.S. PATENT DOCUMENTS

| | | | |
|---|---|---|---|
| 9,462,663 B2* | 10/2016 | Aggarwal | H05B 37/0227 |
| 2012/0044350 A1* | 2/2012 | Verfuerth | H05B 37/0272 348/143 |

* cited by examiner

FIG. 3

| DATE/TIME | LIGHTING APPARATUS ID | LIGHTING CONTROL LEVEL | LIGHTING CONTROL SPEED | LIGHTING CONTROL LEVEL | LIGHTING CONTROL SPEED | ... |
|---|---|---|---|---|---|---|
| | | | | | | |

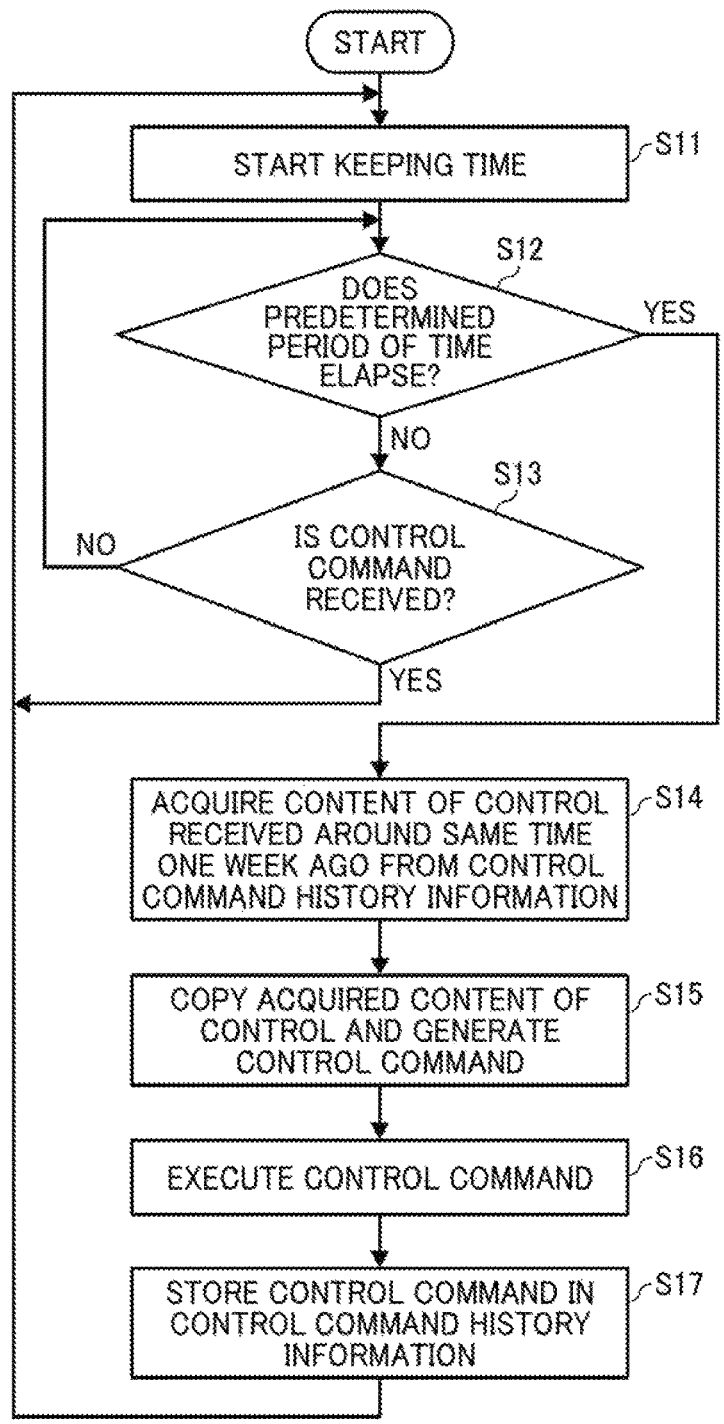

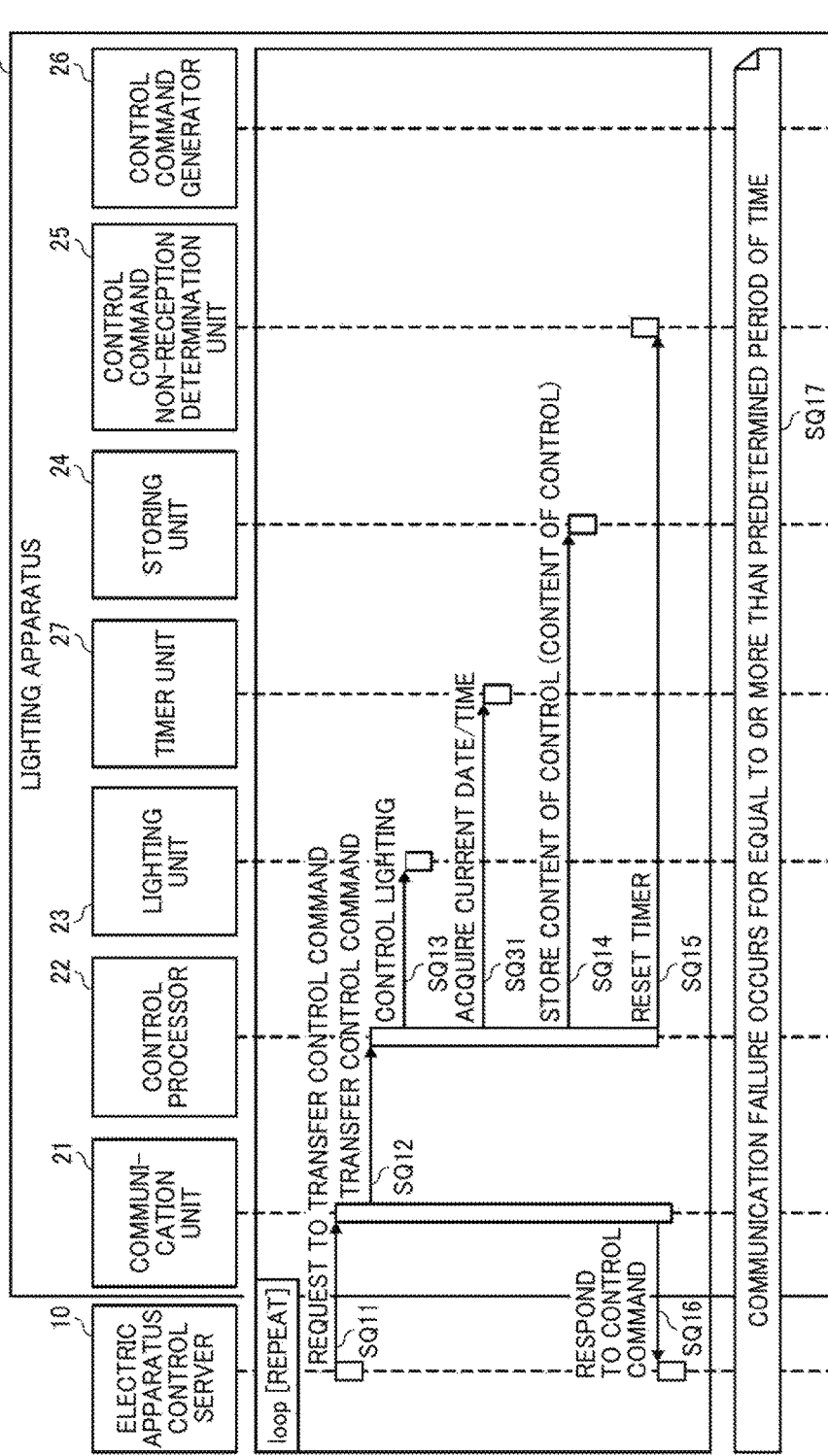

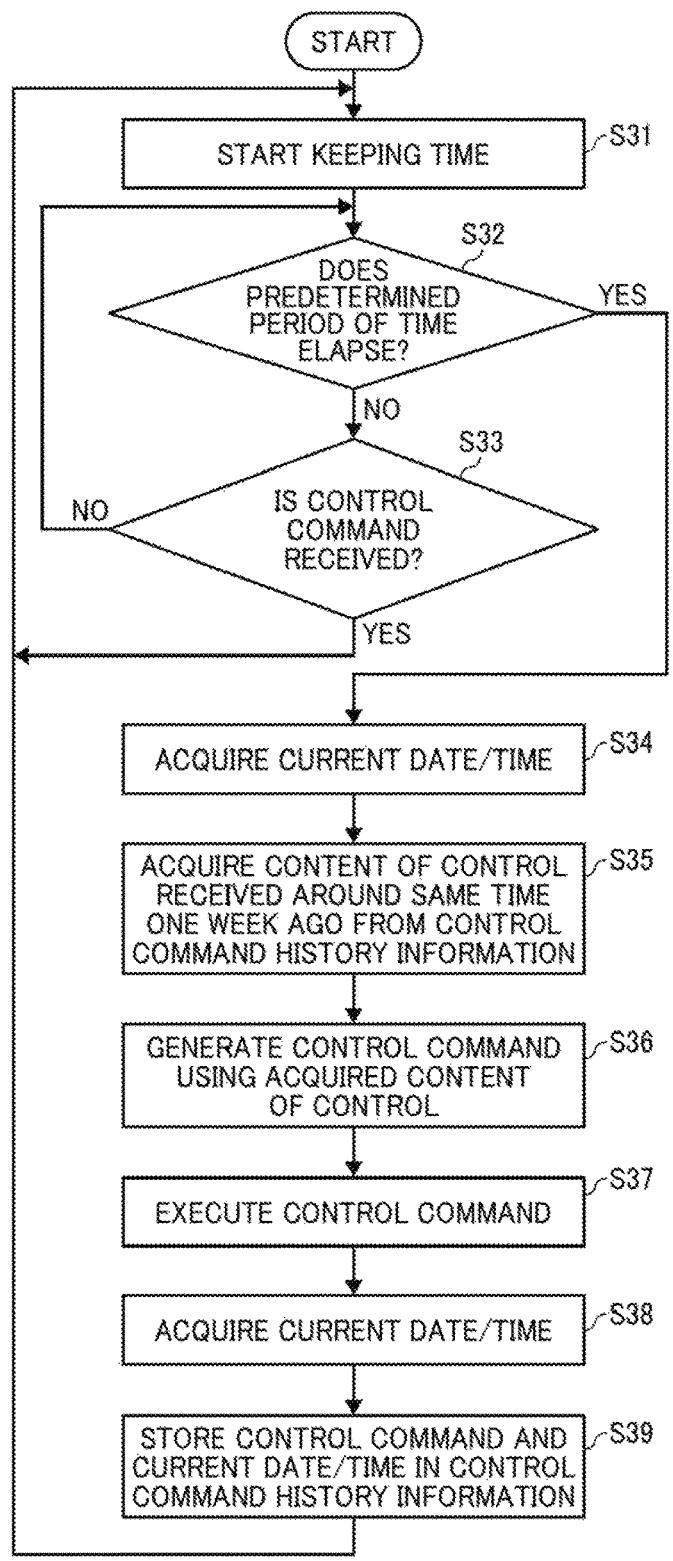

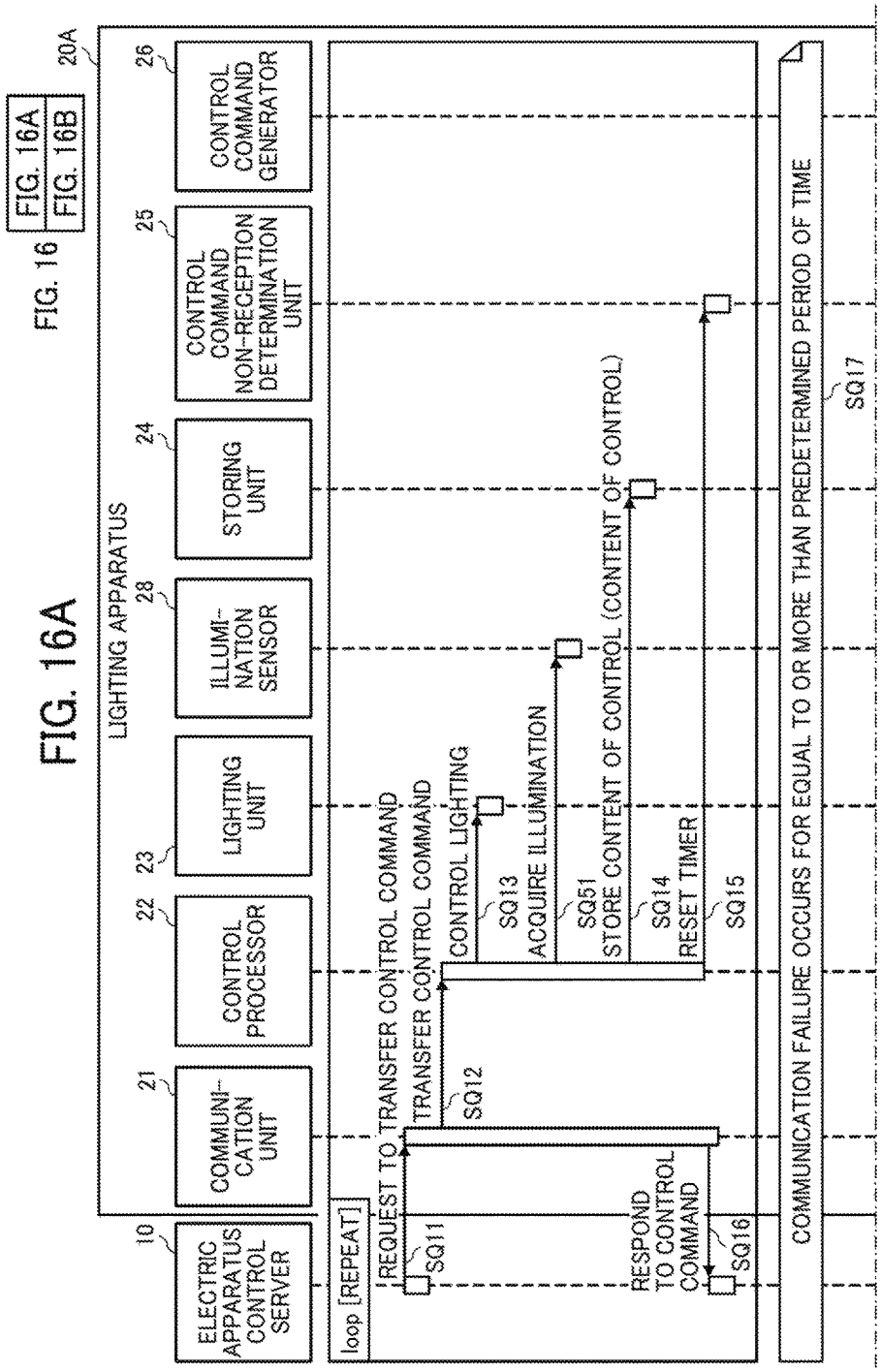

FIG. 19
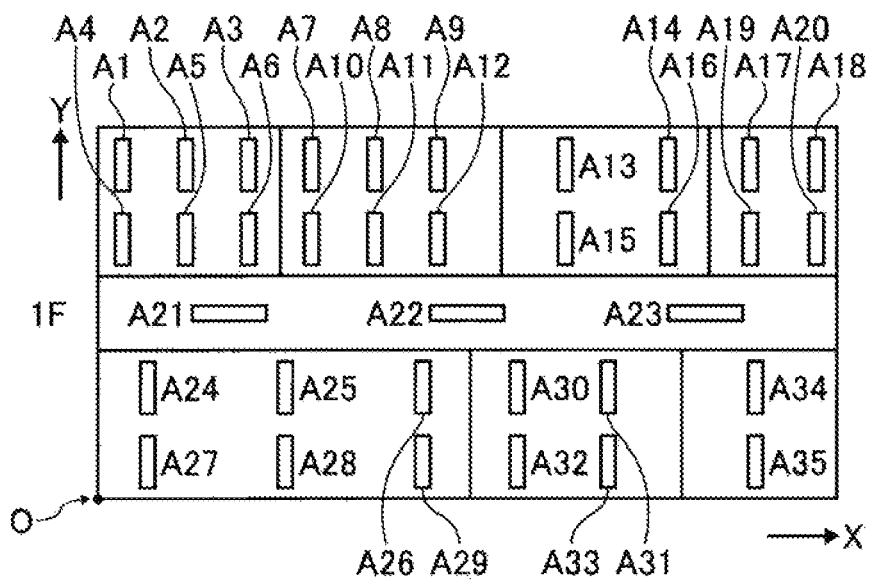
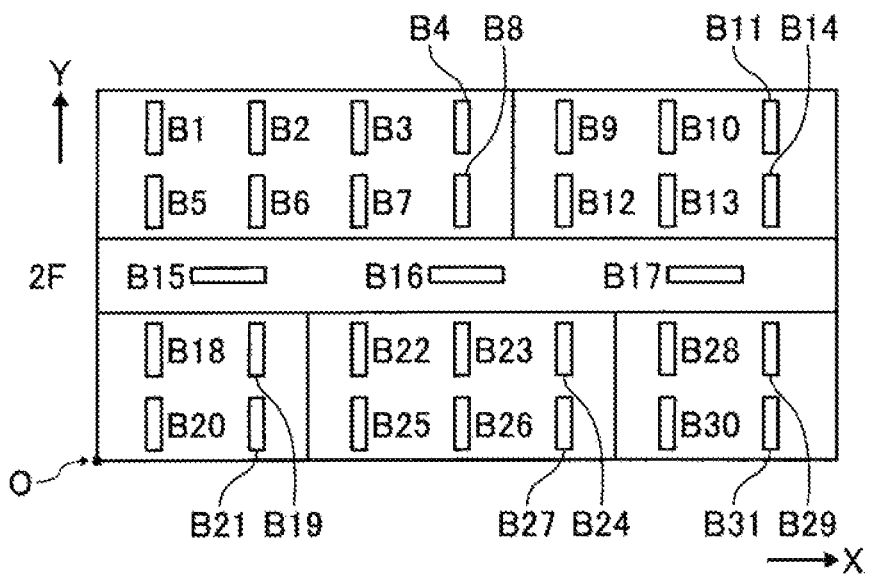

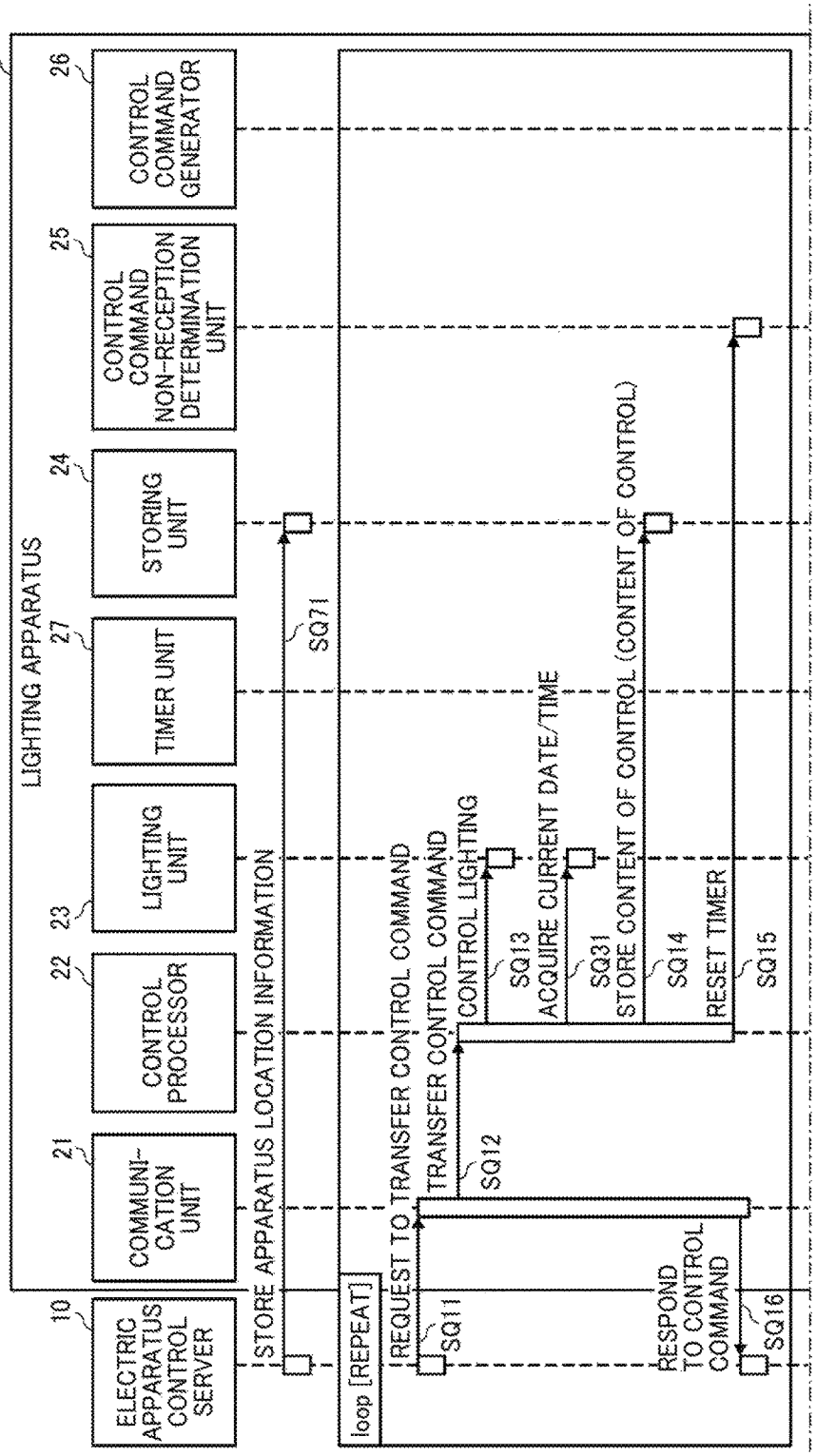

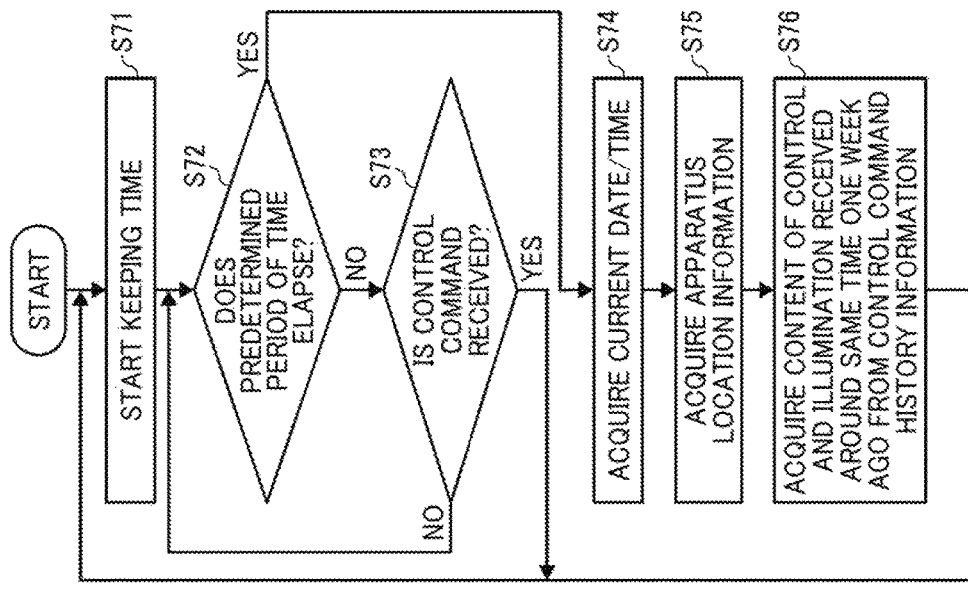

| ID | CONTENT OF CONTROL | | HUMAN SENSOR INFORMATION (PRESENT/ABSENT) |
|---|---|---|---|
| | LIGHTING CONTROL LEVEL | LIGHTING CONTROL SPEED | |
| ⋮ | ⋮ | ⋮ | ⋮ |
| 17728 | 255 | 30 | PRESENT |
| 17729 | 255 | 30 | PRESENT |
| 17730 | 0 | 30 | ABSENT |
| 17731 | 0 | 30 | ABSENT |
| ⋮ | ⋮ | ⋮ | ⋮ |
| 65536 | 100 | 30 | ABSENT |

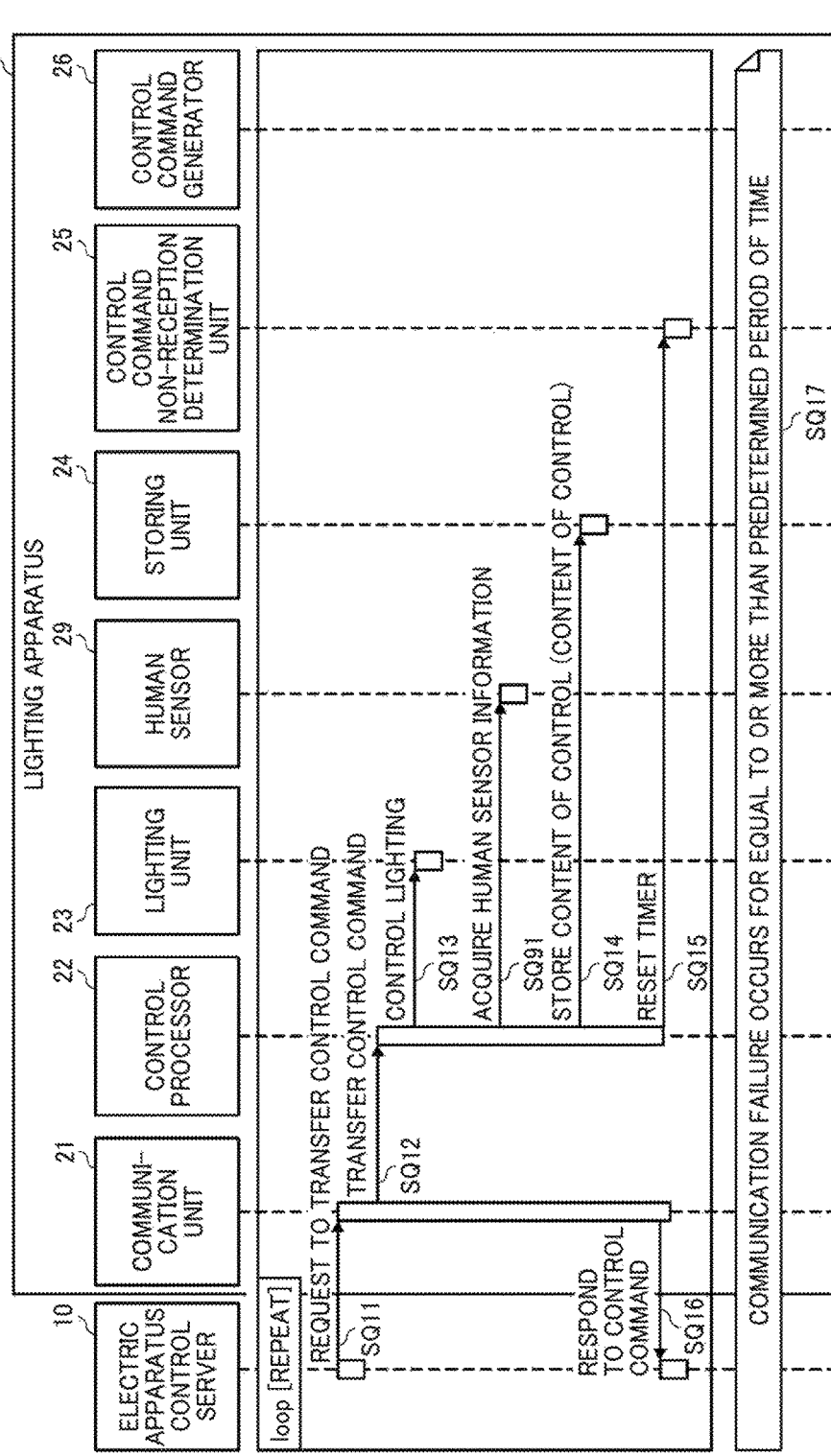

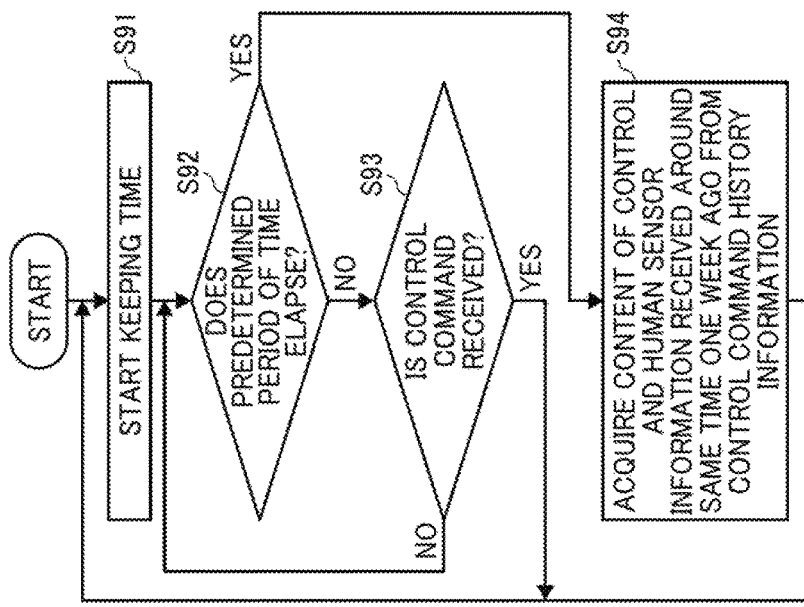

ELECTRIC APPARATUS, ELECTRIC APPARATUS CONTROLLING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2016-099061, filed on May 17, 2016 in the Japan Patent Office, the entire disclosure of which is hereby incorporated by reference herein.

BACKGROUND

Technical Field

The present invention relates to an electric apparatus, an electric apparatus controlling method, and a non-transitory recording medium storing an electric apparatus controlling program.

Background Art

A technology is known, in which electric apparatuses such as home electric appliances and office equipment etc. and servers for controlling the electric apparatuses are connected to a network and the electric apparatuses are remotely controlled by control commands sent to the electric apparatuses from the servers.

In such remote control systems, an outside-home remote controlling apparatus remotely controls electric apparatuses inside the home via a server on a network. An inside-home managing apparatus, located inside the home, manages a status of communication between the inside-home managing apparatus and the server. If breakdown of the communication with the server remains a certain period of time, the electric apparatus stores a current operating status as a previous operating status, and operation of the electric apparatus is stopped. Subsequently, if the status of communication returns to normal, the operation of the electric apparatus is resumed using data of the previous operating status.

SUMMARY

Example embodiments of the present invention provide a novel electric apparatus that includes an electric device that performs operation using electric power being supplied, a receiver that receives one or more control commands for controlling the electric device from a server through a network, a memory that stores control command history information including a content of one or more control commands that are previously received from the server, and circuitry that determines whether or not a control command is received from the server for a predetermined period of time, generates, if the control command is not received from the server for a predetermined period of time, other control command using the content stored in the control command history information, and controls, if the control command is not received from the server for the predetermined period of time, the electric device based on the other control command being generated.

Further example embodiments of the present invention provide a method of controlling an electric apparatus and a non-transitory recording medium storing an electric apparatus controlling program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 3 is a diagram illustrating a control recipe as an embodiment of the present invention;

FIG. 9 is a flowchart illustrating an operation of generating the control command performed by the electric apparatus as an embodiment of the present invention;

FIGS. 12A and 12B are sequence diagrams illustrating an operation performed by the electric apparatus controlling system as an embodiment of the present invention;

FIG. 13 is a flowchart illustrating an operation of generating the control command performed by the electric apparatus as an embodiment of the present invention;

FIGS. 16A and 16B are sequence diagrams illustrating an operation performed by the electric apparatus controlling system as an embodiment of the present invention;

FIG. 19 is a diagram illustrating apparatus layout information as an embodiment of the present invention;

FIGS. 20A and 20B are sequence diagrams illustrating an operation performed by the electric apparatus controlling system as an embodiment of the present invention;

FIGS. 21A and 21B are flowcharts illustrating an operation of generating the control command performed by the electric apparatus as an embodiment of the present invention;

FIGS. 24A and 24B are sequence diagrams illustrating an operation performed by the electric apparatus controlling system as an embodiment of the present invention;

FIGS. 25A and 25B are flowcharts illustrating an operation of generating the control command performed by the electric apparatus as an embodiment of the present invention;

Figure 1:
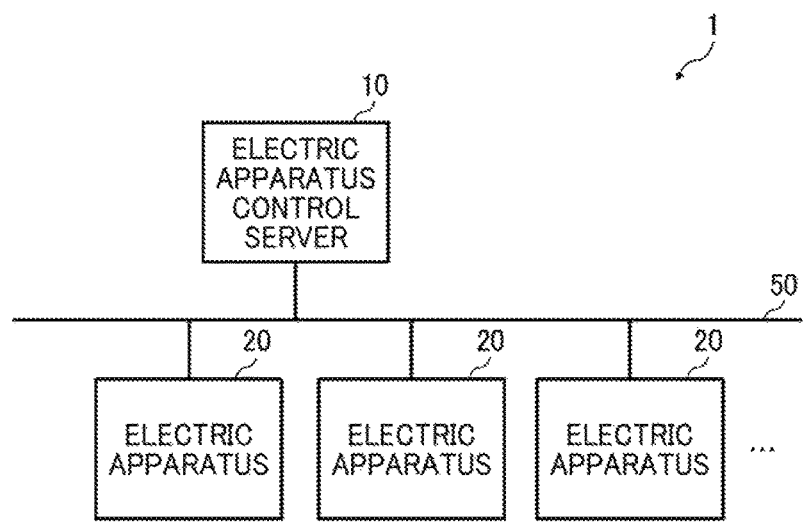
FIG. 1 is a block diagram illustrating a configuration of an electric apparatus controlling system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted as needed.

Embodiment 1

FIG. 1 is a block diagram illustrating a configuration of an electric apparatus controlling system in this embodiment. In an electric apparatus controlling system 1, an electric apparatus controlling server 10 is connected to an electric apparatus 20 via a network 50. In this embodiment, the network 50 is implemented by using a wireless local area network (LAN) compatible with IEEE 802.11 as an example. That is, in this case, the electric apparatus controlling server 10 functions as an access point for the wireless LAN.

Figure 2:
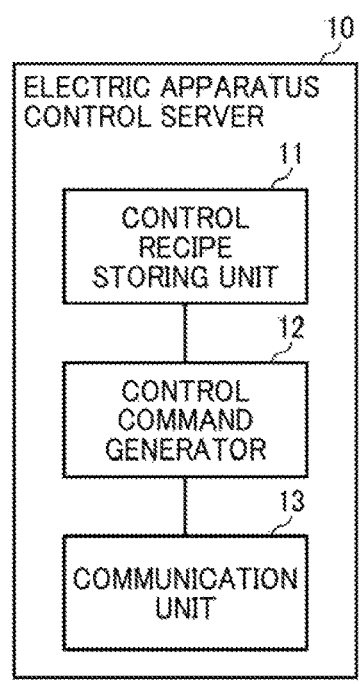
FIG. 2 is a block diagram schematically illustrating a functional configuration of an electric apparatus controlling server as an embodiment of the present invention.

The electric apparatus controlling server 10 is an apparatus (server) that controls operations of the electric apparatus 20 via the network 50. FIG. 2 is a block diagram schematically illustrating a functional configuration of an electric apparatus controlling server in this embodiment. The electric apparatus controlling server 10 includes a control recipe storing unit 11, a control command generator 12, and a communication unit 13. The control recipe storing unit 11 stores a control recipe that describes an operating status of the electric apparatus 20 located at an office or a factory at a predetermined time interval. FIG. 3 is a diagram illustrating the control recipe in this embodiment. In FIG. 3, an example of the control recipe in case the electric apparatus 20 is a lighting apparatus is illustrated. The control recipe includes date/time and an operating status for each electric apparatus 20. For example, in the case of the lighting apparatus, examples of the operating status are lighting control level and lighting control speed. In this case, the control recipe may be separated on weekdays and weekends. Otherwise, the control recipe may be separated for each day of the week. In the below description, the control recipe is assumed to be separated for each day of the week. For example, the control recipe is generated by a user.

The control command generator 12 generates a control command for the electric apparatus 20 to be controlled in accordance with the control recipe. The control command generator 12 generates the control command at a predetermined time interval. For example, the time interval for generating the control command may be determined as 30 seconds, 1 minute, or 5 minutes etc.

The communication unit 13 communicates with the electric apparatus 20 subject to a wireless LAN standard. More specifically, the communication unit 13 generates a control command request including the control command generated by the control command generator 12 and transfers the control command request to each electric apparatus 20. For example, the control command request is generated in the form of frame or packet etc. For example, the control command request is transferred by using broadcast or unicast etc. The transmission using unicast is performed if a communication bandwidth is wide enough. The communication unit 13 transfers the control command request generated by the control command generator 12 to the electric apparatus 20 at almost the same period as the generation interval of the control command.

Figure 4:
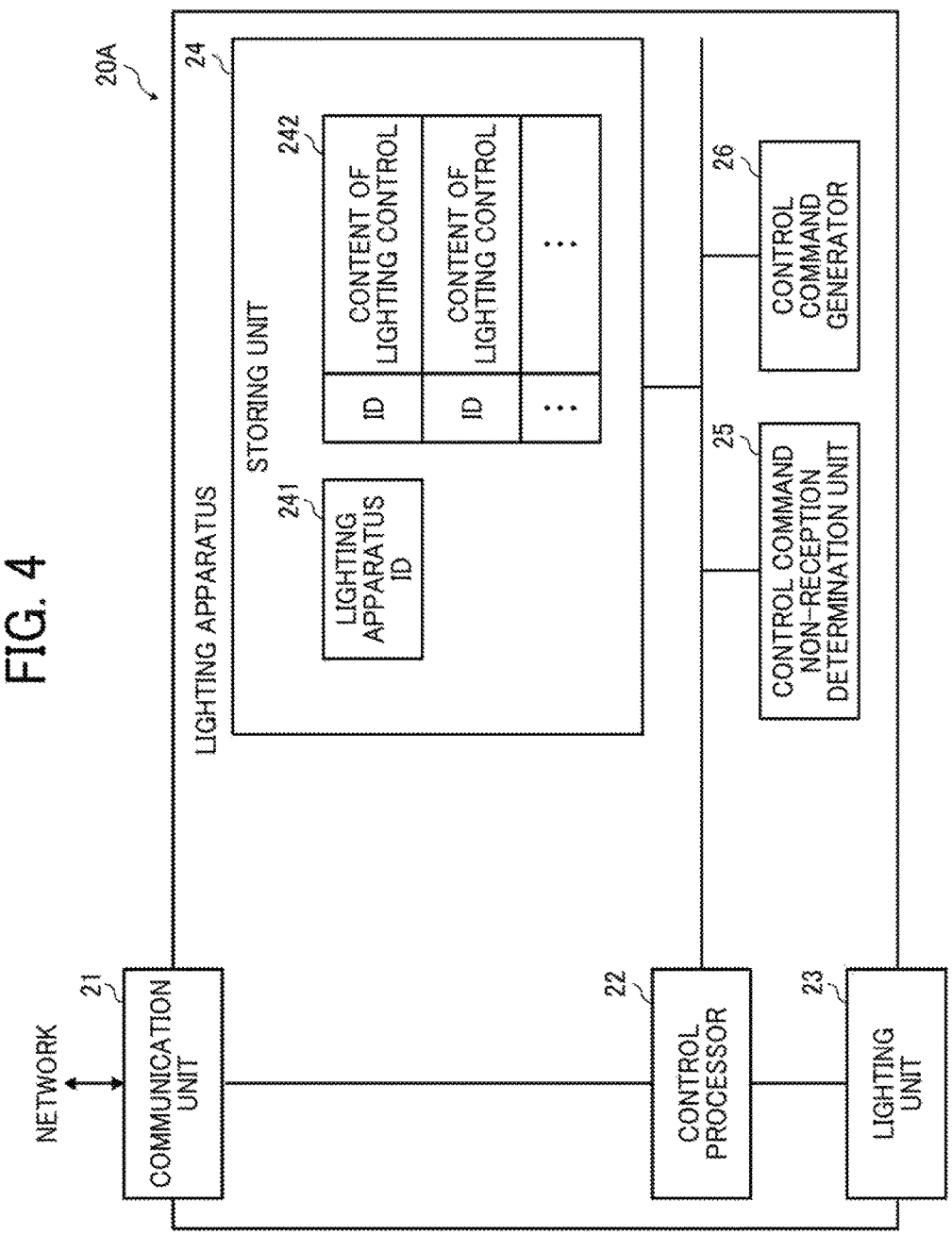
FIG. 4 is a block diagram schematically illustrating a functional configuration of a lighting apparatus as an embodiment of the present invention.

The electric apparatus 20 is supplied with electric power to perform predetermined operations. In this embodiment, the electric apparatus 20 includes a communication unit and operates in accordance with the control command received from the electric apparatus controlling server 10. The electric apparatus 20 controls itself independently if the electric apparatus 20 determines that the control command stops to be received due to communication failure. Examples of the electric apparatus 20 are a lighting apparatus, an air conditioner, and a fan etc. In the below description, a case that the electric apparatus 20 is the lighting apparatus is taken as an example, FIG. 4 is a block diagram schematically illustrating a functional configuration of the lighting apparatus in this embodiment. The lighting apparatus 20A includes a communication unit 21, a control processor 22, a lighting unit 23, a storing unit 24, a control command non-reception determination unit (determining unit) 25, and a control command generator 26.

The communication unit 21 communicates with the electric apparatus control server 10 subject to a wireless LAN standard. In this case, the communication unit 21 includes a network interface and receives the control command request input from outside via the network 50. The communication unit 21 picks up a control command corresponding to a lighting apparatus ID 241 stored in the storing unit 24 from the received control command request and passes the control command to the control command processor 22. In addition, after passing the control command to the control command processor 22, the communication unit 21 transfers a control command response as a response to the control command request to the electric apparatus controlling server 10.

Figure 5A:
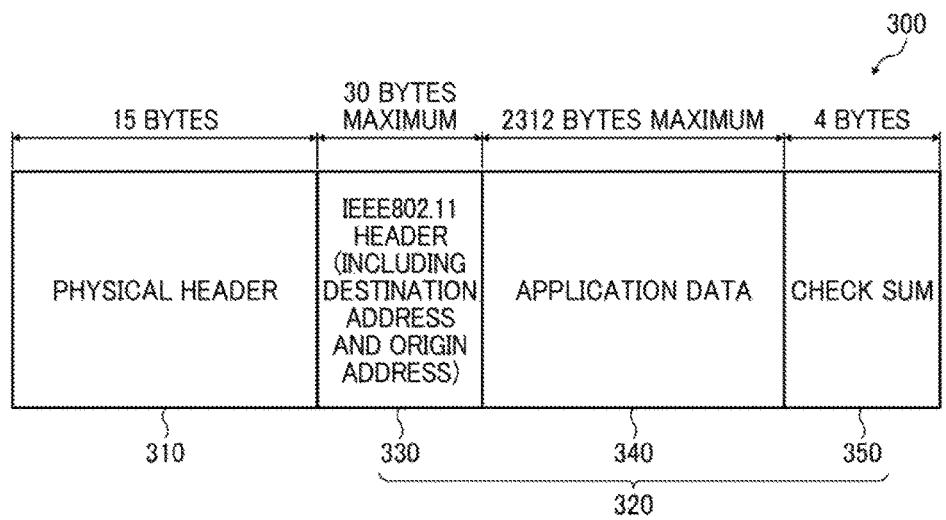
FIGS. 5A and 5B are diagrams illustrating a data configuration of a control command request as an embodiment of the present invention.
Figure 5B:
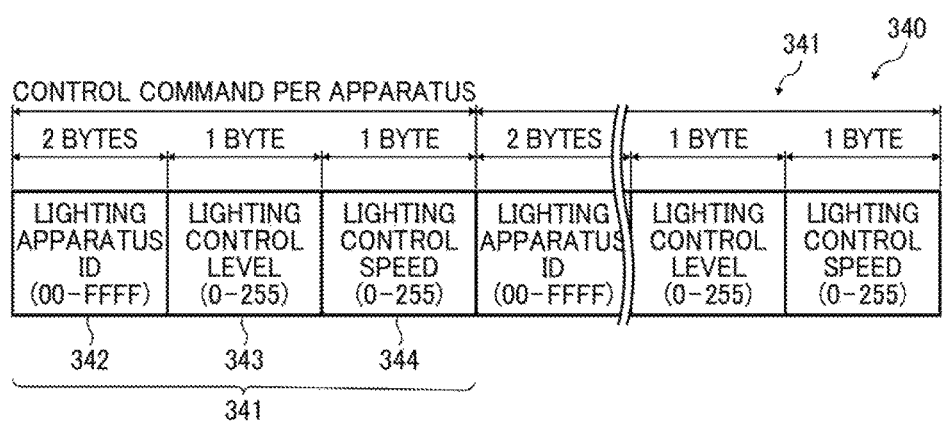

FIG. 5A is a diagram schematically illustrating a frame configuration, and FIG. 5B is a diagram illustrating application data in a frame in detail. In this case, the communication between the electric apparatus controlling server 10 and the electric apparatus 20 is performed using the wireless LAN. Therefore, a Media Access Control (MAC) frame in compliance with the wireless LAN standard is illustrated as an example.

A control command request 300 includes a physical header 310 and a MAC frame 320. The physical header 310 is information added at a physical layer. The physical header 310 includes information specified by the wireless LAN standard (IEEE 802.11), modulation method (transmission rate), and data length etc.

The MAC frame 320 is information added at a data link layer and includes IEEE 802.11 header 330, application data 340, and check sum 350. The IEEE 802.11 header 330 includes information such as a frame type, destination MAC address, source MAC address, and MAC address of an access point etc. The application data 340 is data including the control command for the lighting apparatus 20A. The checksum 350 is data for detecting whether or not loss occurs in exchanging data.

As illustrated in FIG. 5B, the application data 340 includes one or more control commands 341 for each apparatus. The control command 341 for one or more apparatuses includes a lighting apparatus ID 342, a lighting control level 343, and a lighting control speed 344. The lighting apparatus ID 342 is an identifier (identification information) for identifying the lighting apparatus 20A under the control of the electric apparatus controlling server 10. A data size of the lighting apparatus ID 342 may be determined based on the interval of transferring the control command 341 and a period of storing the control command 341 in the lighting apparatus 20A. For example, in case of transferring the control command 341 every 30 seconds and storing the control command 341 for about a week, the data size of the lighting apparatus ID 342 may be determined as 2 bytes.

The lighting control level 343 is data indicating an amount of lighting control of the lighting apparatus 20A. The data size of the lighting control level 343 may be determined based on how precisely the lighting is controlled. Assuming that the data size of the lighting control level 343 is 1 byte, the lighting may be controlled at 256 steps from 0 as a minimum value to 255 as a maximum value.

The lighting control speed 344 is data that specifies speed of changing an amount of lighting control from a current amount of lighting control of the lighting apparatus 20A to an amount of lighting control specified by the lighting control level 343. The data size of the lighting control speed 344 may be determined based on how precisely the lighting control speed 344 is controlled. Assuming that the data size of the lighting control speed 344 is 1 byte, the lighting control speed may be controlled at 256 steps from 0 as a minimum value to 255 as a maximum value. If the maximum value (255) is specified, the lighting control is finished immediately. If the minimum value (0) is specified, the lighting control is performed slowly taking the maximum period of time that the system allows (e.g., 10 minutes). However, if the lighting control is interrupted by another control command 341, the lighting control is performed in accordance with the other control command 341 received afterward (interrupted).

The data size of the application data 340 in the MAC frame 320 may be determined up to 2312 bytes as a maximum value. As a result, as illustrated in FIG. 5B, the control command 341 for multiple apparatuses may be stored in the application data 340. For example, if the data size of the lighting apparatus ID 342 is 2 bytes and the data size of both the lighting control level 343 and the lighting control speed 344 is 1 byte, the control command 341 per apparatus becomes 4 bytes. Therefore, the control command 341 for up to 578 lighting apparatuses 20A as a maximum may be stored in the application data 340 in one MAC frame 320.

The control processor 22 controls the lighting unit 23 in accordance with the received control command. If the communication failure does not occur in the network 50, the control processor 22 receives the control command from the communication unit 21. If the communication failure occurs in the network 50, the control processor 22 receives the control command from the control command generator 26. In addition, the control processor 22 stores the control command received from the communication unit 21 or the control command generator 26 in the storing unit 24.

The lighting unit 23 includes a light source such as a light emitting diode (LED) etc. The lighting unit 23 corresponds to an electric apparatus unit that is supplied electric power and performs a predetermined operation. In accordance with the command from the control processor 22, the lighting unit 23 turns on the light source, turns off the light source, and controls light of the light source.

Figure 6:
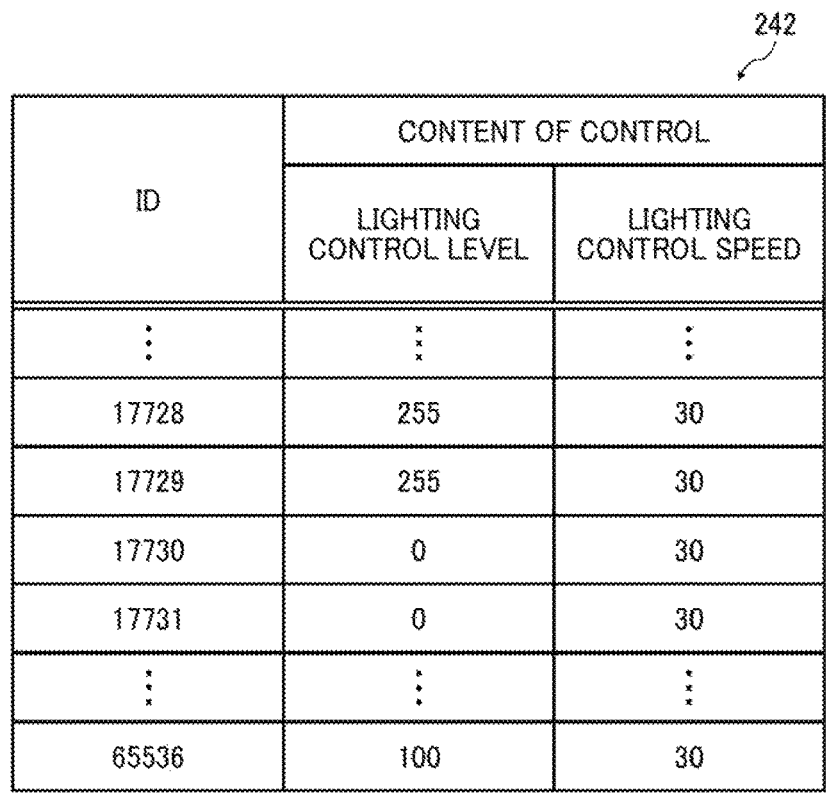
FIG. 6 is a diagram illustrating control command history information as an embodiment of the present invention.

The storing unit stores the lighting apparatus ID 241 and the control command history information 242. The lighting apparatus ID 241 is an identifier (identification information) assigned to the lighting apparatus 20A itself. FIG. 6 is a diagram illustrating control command history information in this embodiment. The control command history information 242 includes multiple records including an ID and a content of control. The ID is identification information for identifying the received control command. For example, an integer number starting from 1 is assigned in order of reception. The content of control is a content of the control command for the lighting apparatus 20A and includes the lighting control level and lighting control speed. For example, the control command history information 242 stores records for 7 days in chronological order. If a record exceeding 7 days is stored, the oldest record is deleted and a new record is registered. As described above, the electric apparatus controlling server 10 transfers the control command request at the predetermined time interval. Therefore, as long as the communication failure does not occur, control commands received at the predetermined interval are lined up in the control command history information 242.

After receiving the control command request from the electric apparatus controlling server 10 previously, the control command non-reception determination unit 25 determines that the communication failure occurs if the subsequent control command request is not received after the predetermined period of time elapses. As the control command non-reception determination unit 25, a watchdog timer that monitors the control command request transferred by the electric apparatus controlling server 10 is used for example.

Figure 7:
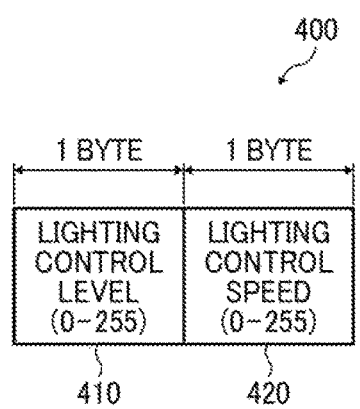
FIG. 7 is a diagram illustrating a control command generated in the lighting apparatus as an embodiment of the present invention.

If the control command non-reception determination unit 25 determines that the communication failure occurs, the control command generator 26 generates the control command using the control command history information 242 in the storing unit 24 and passes the generated control command to the control processor 22. In this embodiment, if the communication failure occurs, the control command generator 26 acquires a record a week ago around the same time when the communication failure occurs from the control command history information 242 and generates a control command copying the content of control from the acquired record. FIG. 7 is a diagram illustrating a control command generated in the lighting apparatus in this embodiment. As illustrated in FIG. 7, a control command 400 generated inside the lighting apparatus 20A includes the lighting control level 410 and the lighting control speed 420. For example, the size of the lighting control level 410 is 1 byte, and the lighting control level 410 may be specified at 256 steps. For example, the size of the lighting control speed 420 is 1 byte, and the lighting control speed 420 may be specified at 256 steps.

Generally, in an office and factory etc., a usage pattern of the electric apparatus 20 becomes paralleled on the same day of the week. As a result, in this embodiment, a record whose communication failure occurred on the same day of the week and time when the communication failure occurred is similar is selected. More specifically, if the communication failure occurs, a control command received around the same time a week ago is acquired. For example, if the control command request 300 is received every 30 seconds, the record at the same time on the same day of the week may be acquired by going back 20160 records. It should be noted, if records for 7 days only are stored, the oldest record is the control command received around the same time a week ago.

Figure 8A:
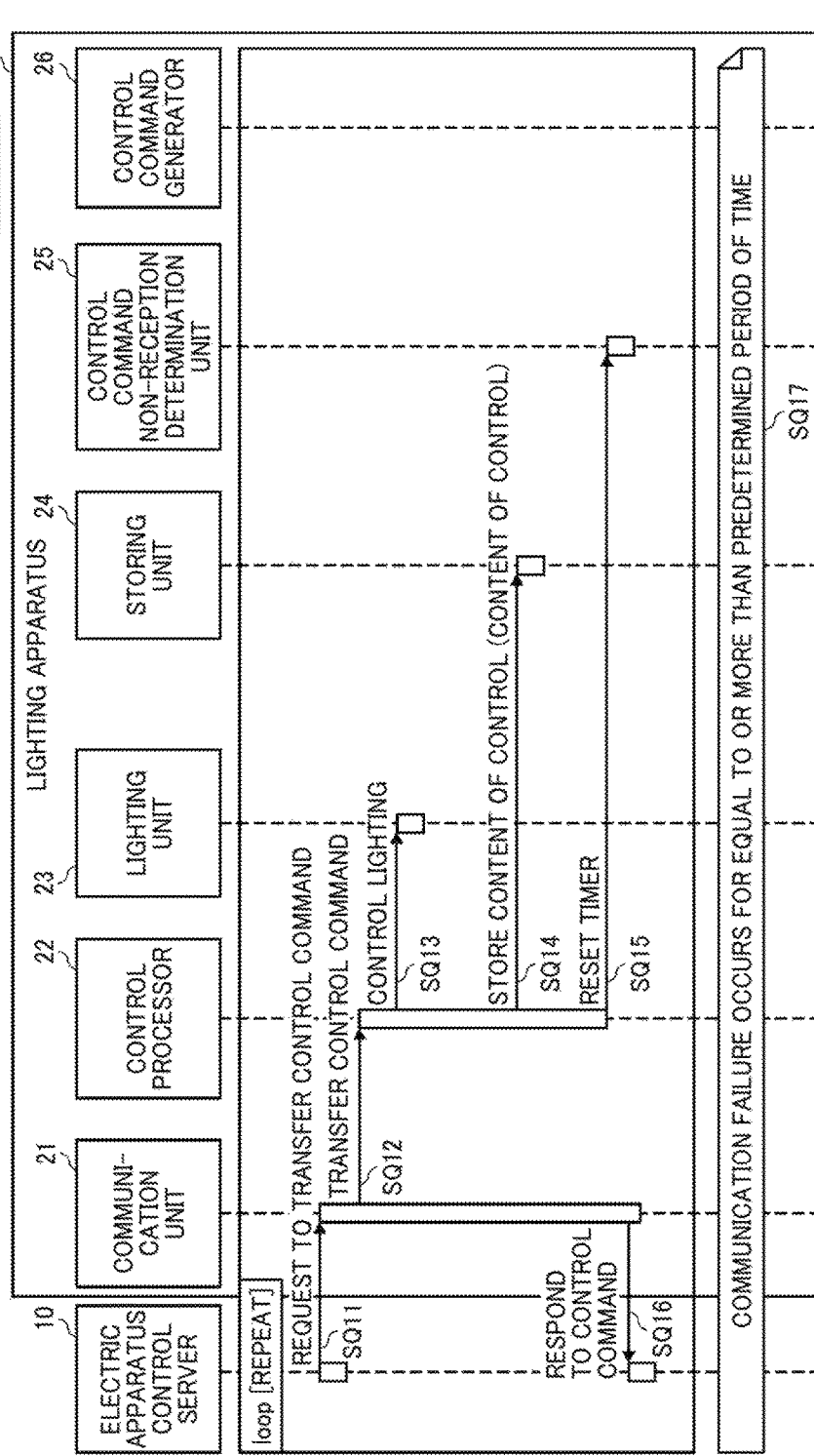
FIGS. 8A and 8B are sequence diagrams illustrating an operation performed by the electric apparatus controlling system as an embodiment of the present invention.
Figure 8B:
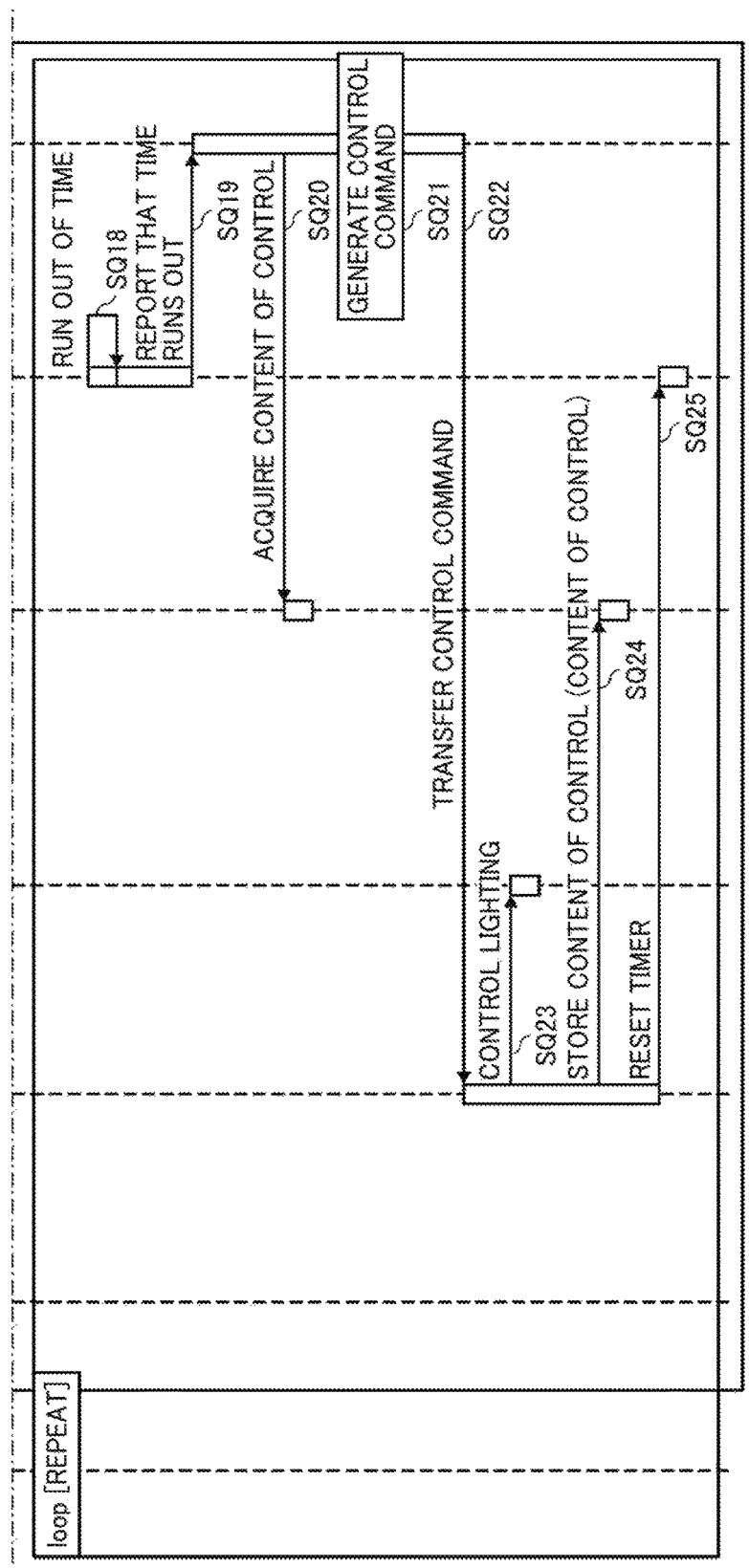

Next, an operation of the electric apparatus control system 1 as described above is described below. FIGS. 8A and 8B are sequence diagrams illustrating an operation performed by the electric apparatus controlling system in this embodiment. First, the electric apparatus control server 10 generates the control command request for controlling an operation of the lighting apparatus 20A to be controlled and transfers the generated control command request to the lighting apparatus 20A in SQ11. For example, a format of the control command request is illustrated in FIG. 5, and the control command request is transferred by using broadcast and unicast etc.

After receiving the control command request, the communication unit 21 in the lighting apparatus 20A picks up the control command whose lighting apparatus ID is the same as the lighting apparatus ID of the lighting apparatus 20A itself among the control command requests and transfers the control command to the control processor 22 in SQ12. In accordance with the received control command, the control processor 22 in the lighting apparatus 20A controls the lighting unit 23 in SQ13. In addition, the control processor 22 stores the received control command in the control command history information 242 in the storing unit 24 in SQ14. Furthermore, the control processor 22 reports to the control command non-reception determination unit 25 that the control command request is received and the control command non-reception determination unit 25 resets the timer in SQ15. A period of time kept by the control command non-reception determination unit 25 (communication failure detection time) may be longer than a time interval that the control command request is transferred (generation time interval). For example, if the control command request is transferred every 30 seconds, the communication failure detection time may be set to about 60 seconds. Subsequently, the communication unit 21 transfers the control command response to the electric apparatus controlling server 10 in SQ16.

After that, by the time when the timer reset by the control command non-reception determination unit 25 runs out of time, if the subsequent control command request is received from the electric apparatus controlling server 10, the operation in steps SQ11 to SQ16 described above is repeated. As described above, the mode controlled by the electric apparatus controlling server 10 in steps SQ11 to SQ16 is referred to as "normal mode".

By contrast, after SQ16, for example, it is assumed that a status that the lighting apparatus 20A does not receive wireless radio wave continues for a predetermined period of time because a partition in an area where the lighting apparatus 20A is located is moved etc. in SQ17. In this case, if the control command request is not received for a certain period of time after receiving the previous control command request (i.e., more than the communication failure detection time in this embodiment), the timer runs out of time in SQ18. Subsequently, the control command non-reception determination unit 25 reports to the control command generator 26 that the timer runs out of time in SQ19. As a result, the lighting apparatus 20A is switched to a control command generating mode that a unique control command is generated.

The control command generator 26 acquires the content of control at the same time on the same day of the week as the control command request supposed to be received from the control command history information 242 in the storing unit 24 in SQ20. For example, by going back a predetermined number of control commands from now, the control command at the same time and day of the week as the control command request supposed to be received may be acquired.

After that, the control command generator 26 generates the control command whose content is the same as the acquired content of control in SQ21. Subsequently, the control command generator 26 passes the generated control command to the control processor 22 in SQ22.

Next, the control processor 22 controls the lighting unit 23 based on the received control command in SQ23. In addition, the control processor 22 registers the received control command in the control command history information 242 in the storing unit 24 in SQ24. Furthermore, the control processor 22 reports to the control command non-reception determination unit 25 that the control command is received and the control command non-reception determination unit 25 resets the timer in SQ25.

After that, by the time when the timer reset by the control command non-reception determination unit 25 runs out of time, if the subsequent control command request is not received from the electric apparatus controlling server 10, the operation in steps SQ18 to SQ23 described above is repeated. As described above, the mode controlled by the electric apparatus 20 in steps SQ18 to SQ23 is referred to as "control command generation mode".

By contrast, by the time when the timer reset by the control command non-reception determination unit 25 runs out of time, if the subsequent control command request is received from the electric apparatus controlling server 10, the operation is switched to the operation of normal mode in steps SQ11 to SQ16 described above.

FIG. 9 is a flowchart illustrating an operation of generating the control command performed by the electric apparatus in this embodiment. First, the control command non-reception determination unit 25 starts keeping time in S11. For example, as illustrated in FIG. 8A, the operation is performed when the control processor 22 that received the control command transfers the request to reset the timer.

Next, the control command non-reception determination unit 25 determines whether or not the predetermined period of time (communication failure detection time) elapses in S12. If the predetermined period of time has not elapsed (NO in S12), the control processor 22 determines whether or not the control command is received in S13. If the control command is received (YES in S13), the operation returns to S11. By contrast, if the control command is not received (NO in S13), the operation returns to S12.

In S12, if the predetermined period of time elapses instead of receiving the control command (YES in S12), the control command generator 26 acquires the control command received around the same time a week ago from the control command history information 242 in the storing unit 24 in S14. For example, if the control command is transferred by the electric apparatus controlling server 10 at the predetermined time interval, the content of control at the same time a week ago may be acquired by going back the predetermined number of records in the control command history information 242.

Next, the control command generator 26 generates the control command copying the acquired content of control in S15 and transfers the generated control command to the control processor 22. Subsequently, the control processor 22 performs the received control command in S16 and stores the received control command in the control command history information 242 in the storing unit 24 in S17. After that, the operation goes back to S11.

In this embodiment, the electric apparatus 20 controlled by the electric apparatus controlling server 10 stores the received content of control in the control command history information 242. If the communication failure occurs in communication with the electric apparatus controlling server 10, the control command is generated using the content of control in the control command history information 242, and the electric apparatus 20 is controlled in accordance with the generated control command. As a result, if the communication failure occurs between the electric apparatus 20 and the electric apparatus controlling server 10, the control other than stopping the operation of the electric apparatus 20 may be performed continuously.

In addition, control commands for equal to or more than 7 days are stored in the control command history information 242. As a result, if the communication failure occurs, by generating the control command using the control command around the same time a week ago, a possibility that control largely different from the status that the communication failure occurs is performed may be reduced.

Embodiment 2

In the first embodiment, the record in the control command history information does not include time information. In this embodiment, a case that the record in the control command history information includes time information is described below. In this embodiment, a case that the electric apparatus is the lighting apparatus is described as an example too.

Figure 10:
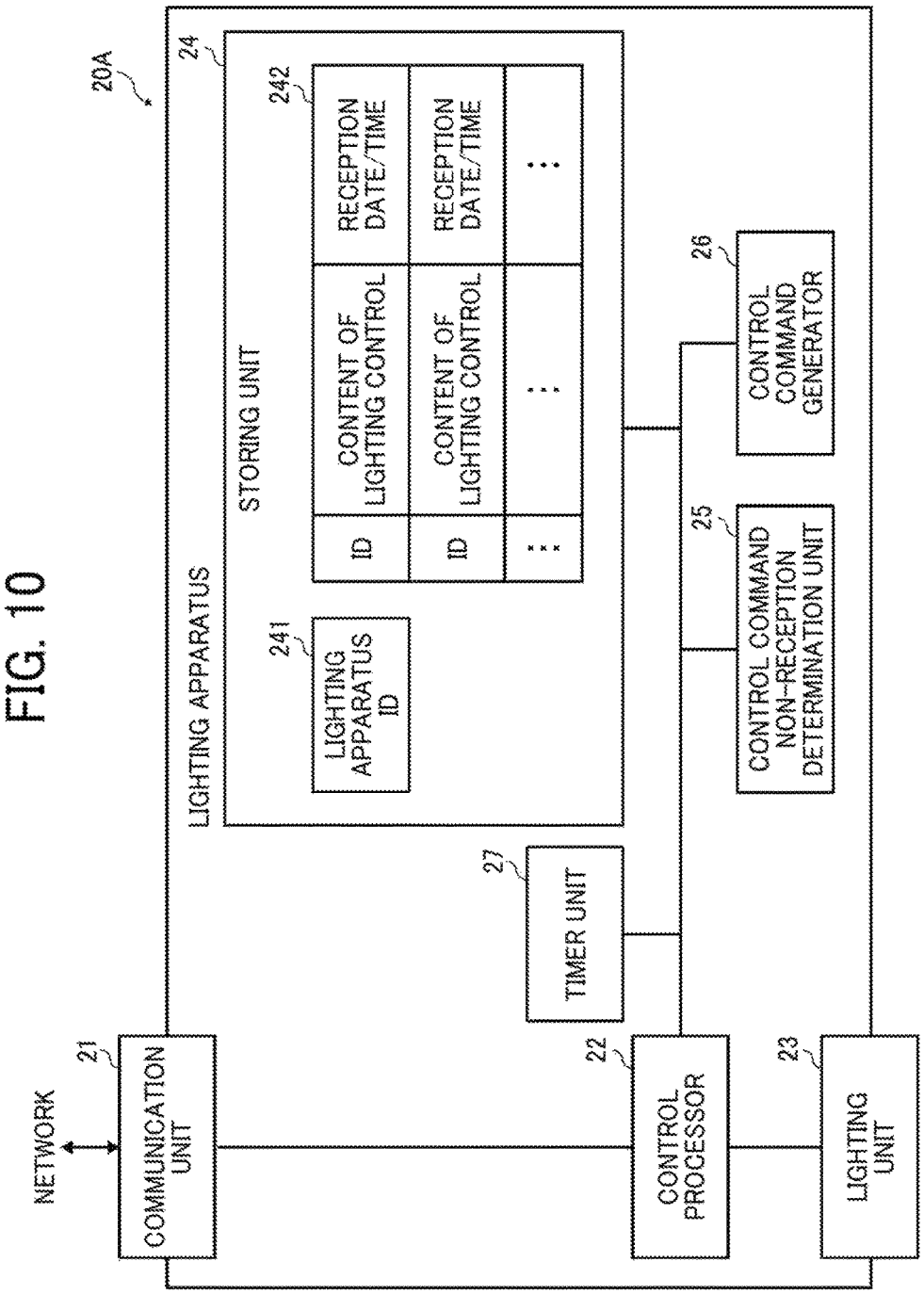
FIG. 10 is a block diagram schematically illustrating a functional configuration of a lighting apparatus as an embodiment of the present invention.

FIG. 10 is a block diagram schematically illustrating a functional configuration of the lighting apparatus in this embodiment. The lighting apparatus 20A further includes a timer 27 in addition to the configuration of the lighting apparatus 20A in the first embodiment. The timer 27 is a clock that indicates current date/time.

Figure 11:
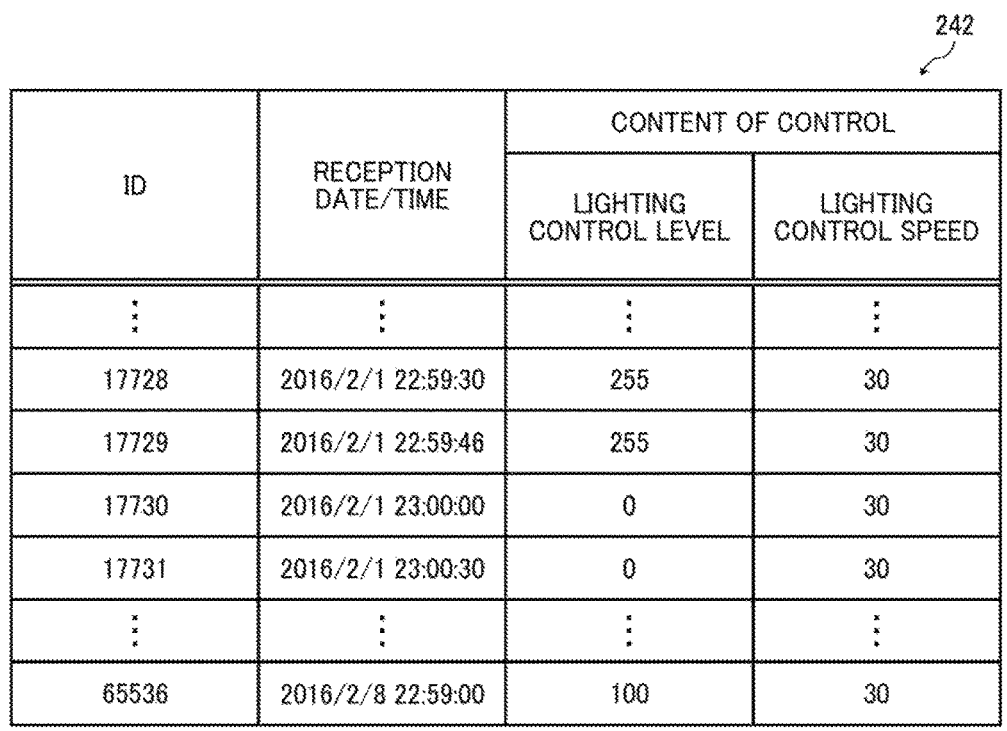
FIG. 11 is a diagram illustrating control command history information as an embodiment of the present invention.

After receiving the control command, the control processor 22 acquires current date/time from the timer 27, adds an ID to the control command, and stores reception date/time along with the control command in the control command history information 242 in the storing unit 24. FIG. 11 is a diagram illustrating control command history information in this embodiment. As illustrated in FIG. 11, by comparison with the first embodiment, each record includes the reception date/time. The reception date/time is data indicating date/time when the control command is received.

If the communication failure occurs, the control command generator 26 acquires current date/time from the timer 27 and searches through the control command history information 242 for the control command received around the same time a week ago from the current date/time. Subsequently, the control command generator 26 generates a new control command using the search result.

In the below description, it should be noted that the same symbol is assigned to the same component as the first embodiment, and descriptions for those components are omitted.

Figure 12B:
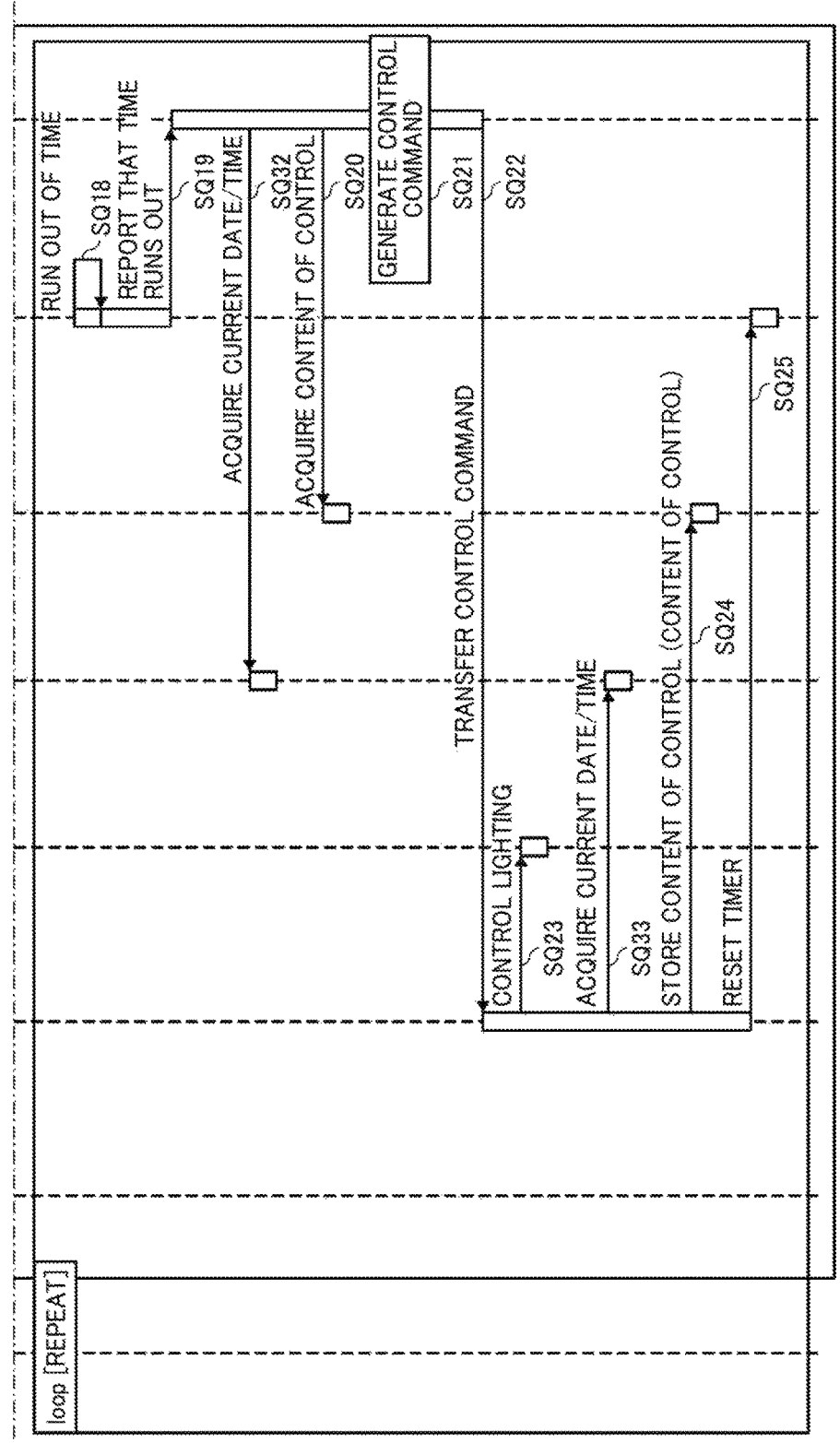

Next, an operation of the electric apparatus control system 1 as described above is described below. FIGS. 12A and 12B are sequence diagrams illustrating an operation performed by the electric apparatus controlling system in this embodiment. Here, points different from the first embodiment illustrated in FIGS. 8A and 8B are described below.

In the normal mode, between SQ13 and SQ14, an operation that the control processor 22 acquires current date/time from the timer 27 is performed in SQ31. It should be noted that, in storing the content of control in SQ14, the control processor 22 adds the current date/time to the received content of control and stores the data in the control command history information 242.

In the control command generation mode, between SQ19 and SQ20, an operation that the control command generator 26 acquires current date/time from the timer 27 is performed in SQ32. In SQ20, the control command generator 26 may easily acquire an intended record by searching for a record around the same time a week ago from the current date/time acquired in SQ32. It should be noted that an operation of generating a control command in SQ21 is described later.

In addition, between SQ23 and SQ24, an operation that the control processor 22 acquires current date/time from the timer 27 is performed in SQ33. It should be noted that, in storing the content of control in SQ24, the control processor 22 adds the current date/time to the received content of control and stores the data in the control command history information 242.

FIG. 13 is a flowchart illustrating an operation of generating the control command performed by the electric apparatus in this embodiment. Just like the operation in steps S11 to S13 in FIG. 9 in the first embodiment, it is determined whether or not the control command is received from starting keeping time by the time when the predetermined period of time (communication failure detection time) elapses in S31 to S33.

If the predetermined period of time elapses without receiving the control command (YES in S32), the control command generator 26 acquires the current date/time from the timer 27 in S34. Subsequently, just like the operation in steps S14 to S16 in FIG. 9, the content of control around the same time a week ago from the point when the communication failure occurs is acquired from the control command history information 242, the control command is generated using the acquired content of control and executed in S35 to S37.

It should be noted that several methods for generating the control command in S36 are described as examples. The first method is the control command is generated by referring to the past content of control only received at time nearest to the time when the communication failure occurs on the same week day as the weekday when the communication failure occurs. The second method is the control command is generated by rounding up control commands received within the communication non-reception detection time configured to the system at the time when the communication failure occurs at the same weekday as the weekday when the communication failure occurs.

Specific examples for the first method and the second method are described below with reference to the control command history information 242 in FIG. 11. Here, it is assumed that, after receiving the control command (whose ID is 65536) at 22:59:00 on Feb. 8, 2016 from the electric apparatus controlling server 10, the lighting apparatus 20A detects that the control command from the electric apparatus controlling server 10 breaks up because the communication failure occurs. That is, the time when the communication failure is detected is 23:00:00 on Feb. 8, 2016.

In case of the first method, time nearest to the same time a week ago is a record whose ID is 17730. As a result, the control command generator 26 generates the control command with reference to the content of control received at 23:00:00 on Feb. 12, 2016 only. The control command generator 26 generates the control command by copying the content of control. The lighting control level in the newly generated control command is 0, and the lighting control speed is 30.

In case of the second method, the communication non-reception detection time configured to the system is 1 minutes. Therefore, the content of control received within 1 minute from the same time a week ago from the day when the last control command request is received is the target to be considered. In this case, three control commands whose IDs are 17728 to 17730 received at 22:59:01 to 23:00:00 on Feb. 12, 2016 are rounded up to generate the control command.

Examples of the method for rounding up multiple control commands are averaging each control command and picking up the most common content of control etc. In the method of averaging control commands, the lighting control level in the newly generated control command is 170 (equal to (255+255+0)/3), and the lighting control speed is 30. In the method of picking up the most common content of control, among content of control received three times within the period of time described above, 255 for the lighting control level is twice and the most common, and 30 for the lighting control speed is three times and the most common. As a result, 255 is selected for the lighting control level in the control command newly generated, and 30 is selected for the lighting control speed.

After the new control command is generated, if the communication failure continues for 1 minute, that is, the control command is not received at 23:00:01 to 23:01:00 at Feb. 8, 2016, both in the first method and the second method, the content of control whose ID is 17731 received at 23:00:30 on Feb. 12, 2016, a week ago is used for generating the new control command. The lighting control level in the newly generated control command is 0, and the lighting control speed is 30.

Now, going back to the flowchart in FIG. 13, the control processor 22 acquires current date/time from the timer 27 in S38 and stores the control command in the control command history information 242 along with the acquired current date/time in S39. After that, the operation goes back to S31.

In this embodiment, time when the control command is received is acquired, and the content of control command and the current date/time are stored in the control command history information 242. As a result, if the communication failure occurs, based on the date/time when the communication occurs, the control command around the same time a week ago may be searched for and acquired. Consequently, compared to the first embodiment, more high-precision control with more high-usability may be performed in this embodiment.

Embodiment 3

In this embodiment, illumination information at the time when the control command is received is also recorded, and a case that the control command is generated in consideration of illumination information in the past history when the communication failure occurs is described below.

Figure 14:
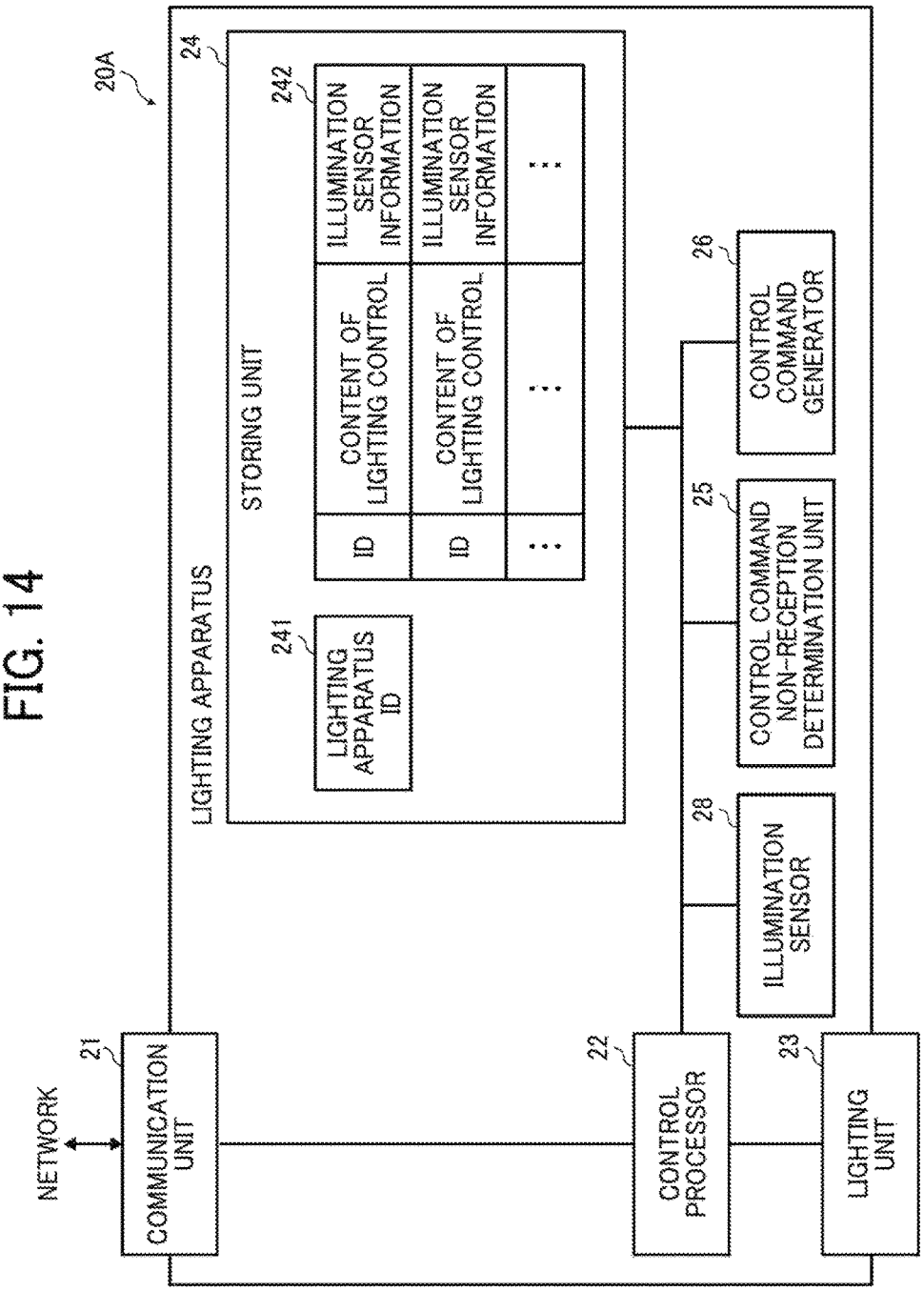
FIG. 14 is a block diagram schematically illustrating a functional configuration of a lighting apparatus as an embodiment of the present invention.

FIG. 14 is a block diagram schematically illustrating a functional configuration of the lighting apparatus in this embodiment. The lighting apparatus 20A further includes an illumination sensor 28 in addition to the configuration of the lighting apparatus 20A in the first embodiment. The illumination sensor 28 measures illumination at an area where the illumination sensor 28 is located and passes the measurement result to the control processor 22. The area where the illumination sensor 28 is located is almost the same as the area where the lighting apparatus 20A.

Figure 15:
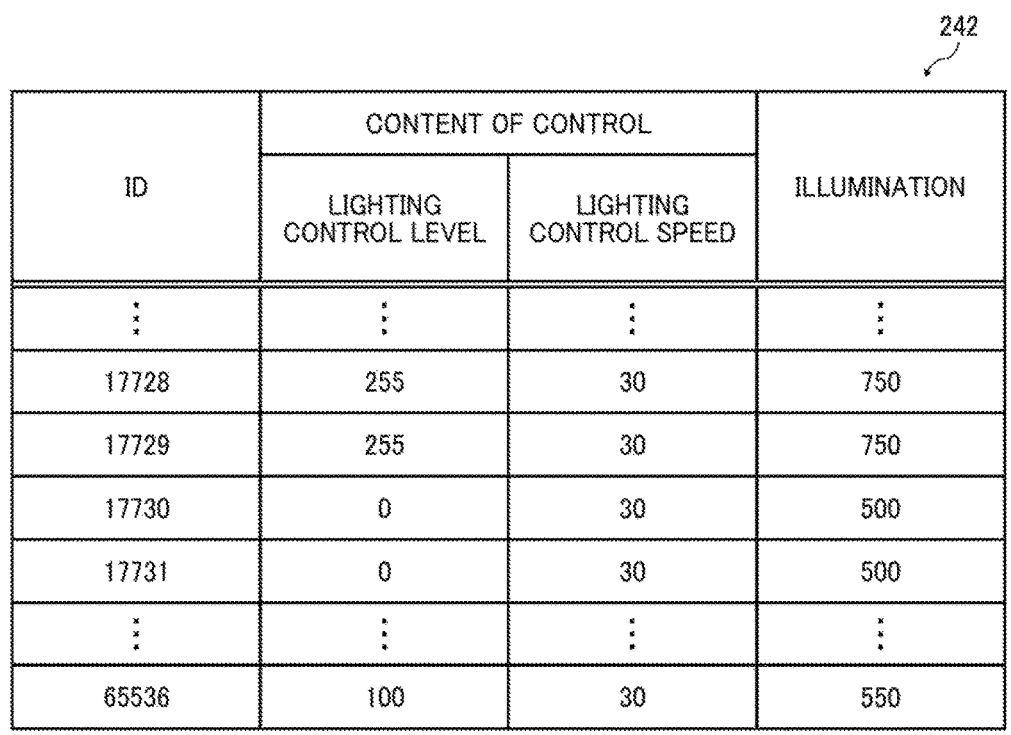
FIG. 15 is a diagram illustrating control command history information as an embodiment of the present invention.

After receiving the control command, the control processor 22 acquires illumination at that time from the illumination sensor 28, adds an ID to the control command, and stores illumination along with the control command in the control command history information 242 in the storing unit 24. FIG. 15 is a diagram illustrating control command history information in this embodiment. As illustrated in FIG. 15, by comparison with the first embodiment, each record includes the illumination at the time when the control command is received.

If the communication failure occurs, the control command generator 26 acquires the control command and illumination received around the same time a week ago from the current date/time from the control command history information 242. If the acquired control command requests to turn on the light, the control command generator 26 copies the content of the acquired control command and generates the control command. If the acquired control command requests to turn off the light and the illumination is equal to or more than a predetermined value, the control command generator 26 copies the content of the acquired control command and generates the control command. By contrast, if the acquired control command requests to turn off the light and the illumination is less than the predetermined value, the control command generator 26 generates the control command that requests to turn on the light. In this case, for example, the control command whose lighting control level is set to the maximum value (255) and lighting control speed is set to predetermined value 30 may be generated.

In the below description, it should be noted that the same symbol is assigned to the same component as the first embodiment, and descriptions for those components are omitted.

Figure 16B:
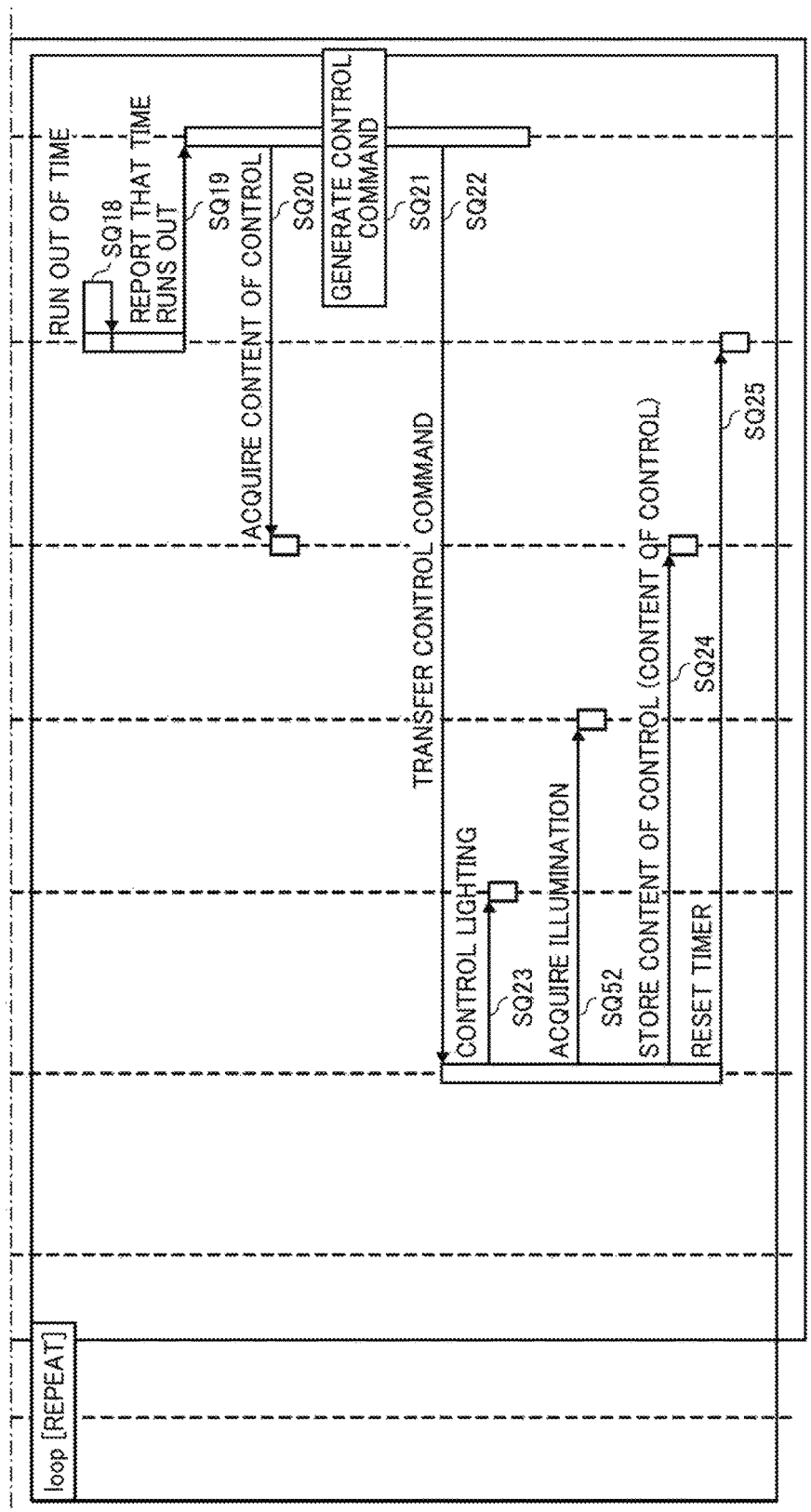

Next, an operation of the electric apparatus control system 1 as described above is described below. FIGS. 16A and 16B are sequence diagrams illustrating an operation performed by the electric apparatus controlling system in this embodiment. Here, points different from the first embodiment illustrated in FIGS. 8A and 8B are described below.

In the normal mode, between SQ13 and SQ14, an operation that the control processor 22 acquires illumination from the illumination sensor 28 is performed in SQ51. It should be noted that, in storing the content of control in SQ14, the control processor 22 adds the illumination to the received content of control and stores the data in the control command history information 242.

In the control command generation mode, between SQ23 and SQ24, an operation that the control processor 22 acquires illumination from the illumination sensor 28 is performed in SQ52. It should be noted that, in storing the content of control in SQ24, the control processor 22 adds the illumination to the received content of control and stores the data in the control command history information 242. The operation of generating the control command in SQ21 is described below.

Figure 17:
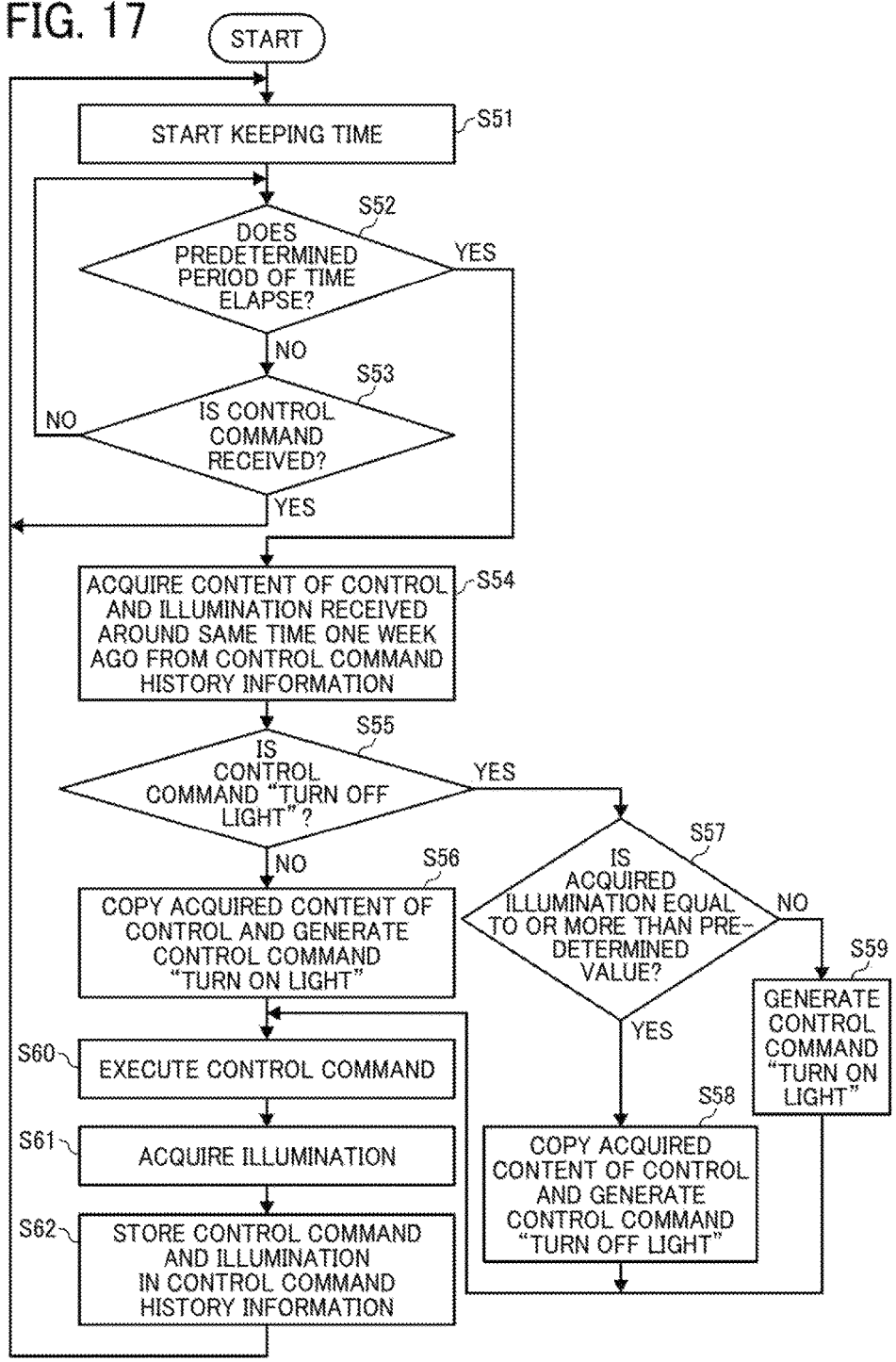
FIG. 17 is a flowchart illustrating an operation of generating the control command performed by the electric apparatus as an embodiment of the present invention.

FIG. 17 is a flowchart illustrating an operation of generating the control command performed by the electric apparatus in this embodiment. Just like the operation in steps S11 to S13 in FIG. 9 in the first embodiment, it is determined whether or not the control command is received from starting keeping time by the time when the predetermined period of time (communication failure detection time) elapses in S51 to S53.

If the predetermined period of time elapses instead of receiving the control command (YES in S52), the control command generator 26 acquires the control command and illumination received around the same time a week ago from the time when the communication failure occurs from the control command history information 242 in S54. Subsequently, the control command generator 26 determines whether or not the acquire control command instructs to turn off the light in S55. If the acquired control command does not instruct to turn off the light but turn on the light (NO in S55), the content of the acquired control command is copied, and the control command that instructs to turn on the light is generated in S56.

If the acquired control command instructs to turn off the light (YES in S55), the control command generator 26 determines whether or not the acquired illumination is equal to or more than a predetermined value in S57. If the acquired control command is equal to or more than the predetermined value (YES in S57), the control command generator 26 copies the content of the acquired content of the control command and generates the control command that instructs to turn off the light in S58. This is because, if the predetermined illumination remains even in case of turning off the light, there is no inconvenience for a worker who stays at that area.

By contrast, if the acquired illumination is less than the predetermined value (NO in S57), the control command generator 26 generates the control command that instructs to turn on the light in S59. For example, a control command that instructs to turn on the light at a predetermined lighting control level and lighting control speed may be generated preliminarily and used. This is because, if the predetermined illumination does not remain in case of turning off the light, there is some inconvenience for the worker who stays at that area.

The control command generated in S56, S58, or S59 is passed to the control processor 22. Subsequently, the control processor 22 executes the received control command in S60. In addition, the control processor 22 acquires the illumination at that time from the illumination sensor 28 in S61 and stores the illumination along with the received control command in the control command history information 242 in S62. Subsequently, the operation goes back to S51.

In this embodiment, the illumination sensor 28 that measures illumination at the area where the lighting apparatus 20A is located is included, and the illumination is stored in the control command history information 242 along with the control command. As a result, even if the communication failure occurs and the control command around the same time a week ago instructs to turn off the light, in accordance with the illumination stored in the control command history information 242, the lighting apparatus 20A may be kept turned off or turned on.

In the above description, if the acquired control command instructs to turn off the light, the control command generator 26 generates the control command that instructs to turn on the light or turn off the light using the illumination acquired from the control command history information 242. However, in generating the control command, the illumination may be acquired from the illumination sensor 28, and the control command that instructs to turn off the light or turn on the light may be generated in accordance with the illumination at that time.

Embodiment 4

In this embodiment, in accordance with location information of the lighting apparatus, a case that it is determined whether or not to turn on the light or to turn off the light is described.

Figure 18:
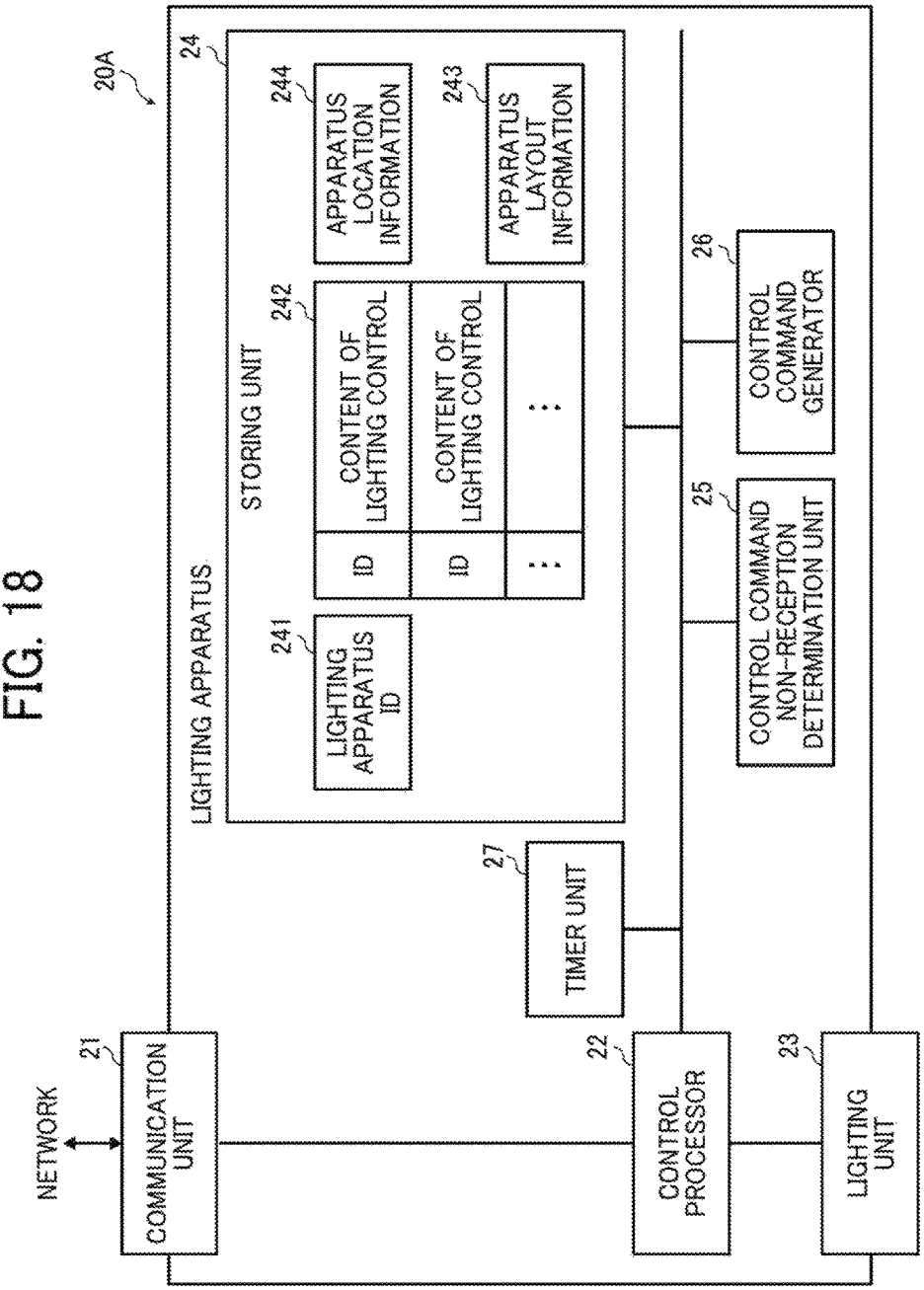
FIG. 18 is a block diagram schematically illustrating a functional configuration of a lighting apparatus as an embodiment of the present invention.

FIG. 18 is a block diagram schematically illustrating a functional configuration of the lighting apparatus in this embodiment. While the configuration of the lighting apparatus 20A is almost the same as the configuration in the second embodiment, in addition to the lighting apparatus ID 241 and the control command history information 242, a point that the storing unit 24 includes apparatus layout information 243 and apparatus location information 244 is different from the second embodiment. The apparatus layout information 243 is a layout map of a building (area) where the lighting apparatus 20A is located. FIG. 19 is a diagram illustrating the apparatus layout information in this embodiment. In FIG. 19, a layout on the first floor and a layout on the second floor are illustrated. An origin point O is located at a point as a reference on each floor, and X-axis and Y-axis perpendicular to each other are drawn. In addition, Z-axis is drawn in height direction of the floor. By using the combination of (X, Y, Z), the location of the lighting apparatus 20A on each floor may be specified. Otherwise, by assigning identification information A1 to A35 and B1 to B31 to locations where the lighting apparatus 20A is located in the apparatus layout, locations of the lighting apparatus 20A may be specified.

The apparatus location information 244 is information that indicates the location of the lighting apparatus 20A in the apparatus layout information 243. For example, as described above, the apparatus location information 244 may be coordinates that indicates the location of the lighting apparatus 20A. Otherwise, the apparatus location information 244 may be identification information of the location of the lighting apparatus 20A allocated in the apparatus layout.

If the communication failure occurs, the control command generator 26 acquires the apparatus location information 244 and the content of control received around the same time a week ago from the time when the communication failure occurs, acquires date/time when the communication failure occurs from the timer 27, and generates the control command. More specifically, with reference to the apparatus layout information 243, if the apparatus location information 244 indicates a corner of a room, the control command generator 26 generates the control command that instructs to turn off the light. If the apparatus location information does not indicate the corner of the room, the control command generator 26 generates the control command that instructs to turn off the light if it is possible to obtain outside light at that location at that time. By contrast, the control command generator 26 generates the control command that instructs to turn on the light if it is impossible to obtain outside light at that location or it is impossible to obtain outside light at that time. However, the configuration is not limited to this embodiment.

In the below description, it should be noted that the same symbol is assigned to the same component as the first embodiment and the second embodiment, and descriptions for those components are omitted.

Figure 20B:
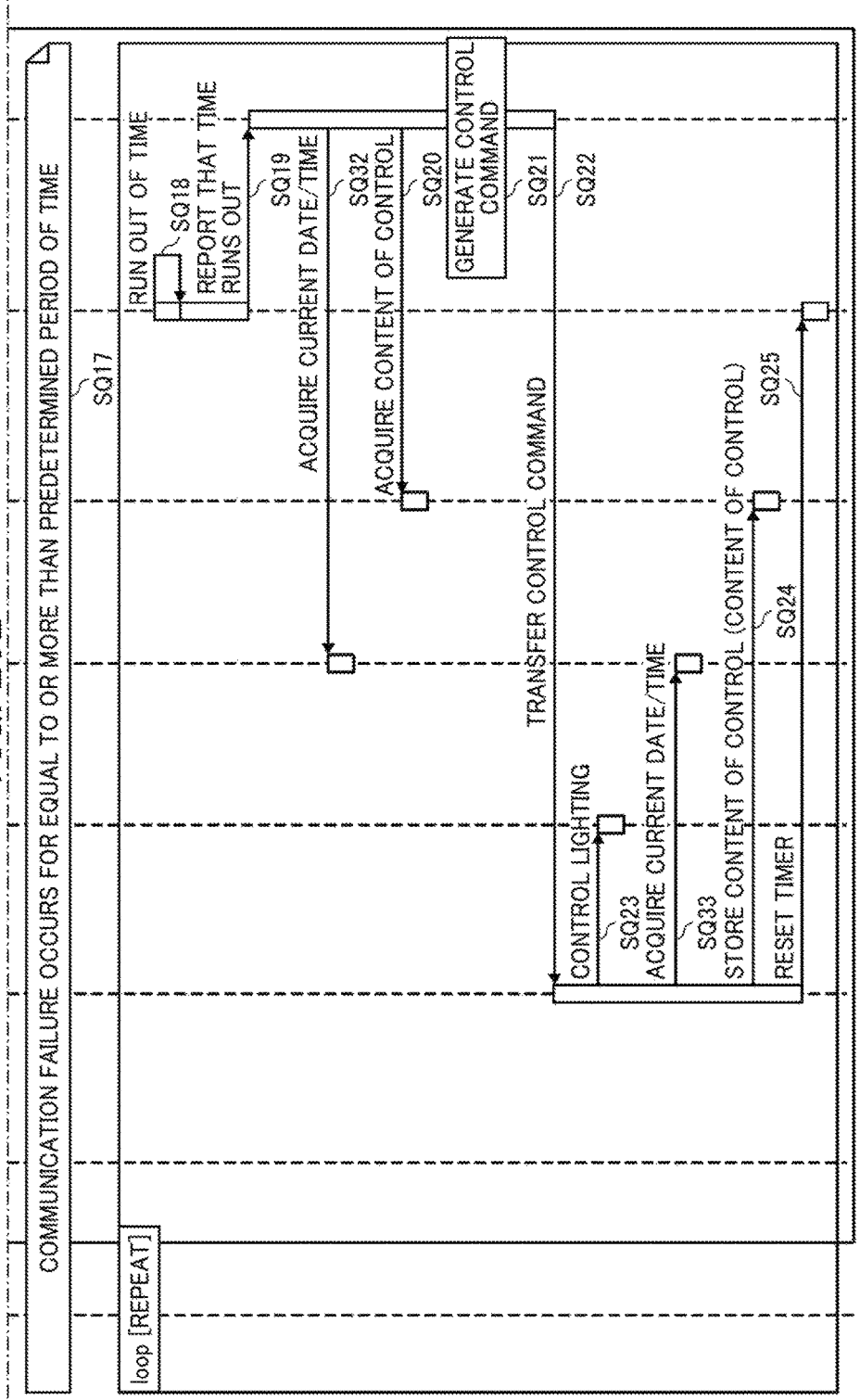

Next, an operation of the electric apparatus control system 1 as described above is described below. FIGS. 20A and 20B are sequence diagrams illustrating an operation performed by the electric apparatus controlling system in this embodiment. Here, points different from the second embodiment illustrated in FIGS. 12A and 12B are described below.

If the lighting apparatus 20A is located at a predetermined location, the electric apparatus controlling server 10 commands to store the apparatus location information 244 of the lighting apparatus 20A in SQ71. As a result, the apparatus location information 244 is stored in the storing unit 24 in the lighting apparatus 20A. Subsequently, the same operation as illustrated in FIGS. 12A and 12 is performed.

Figure 21B:
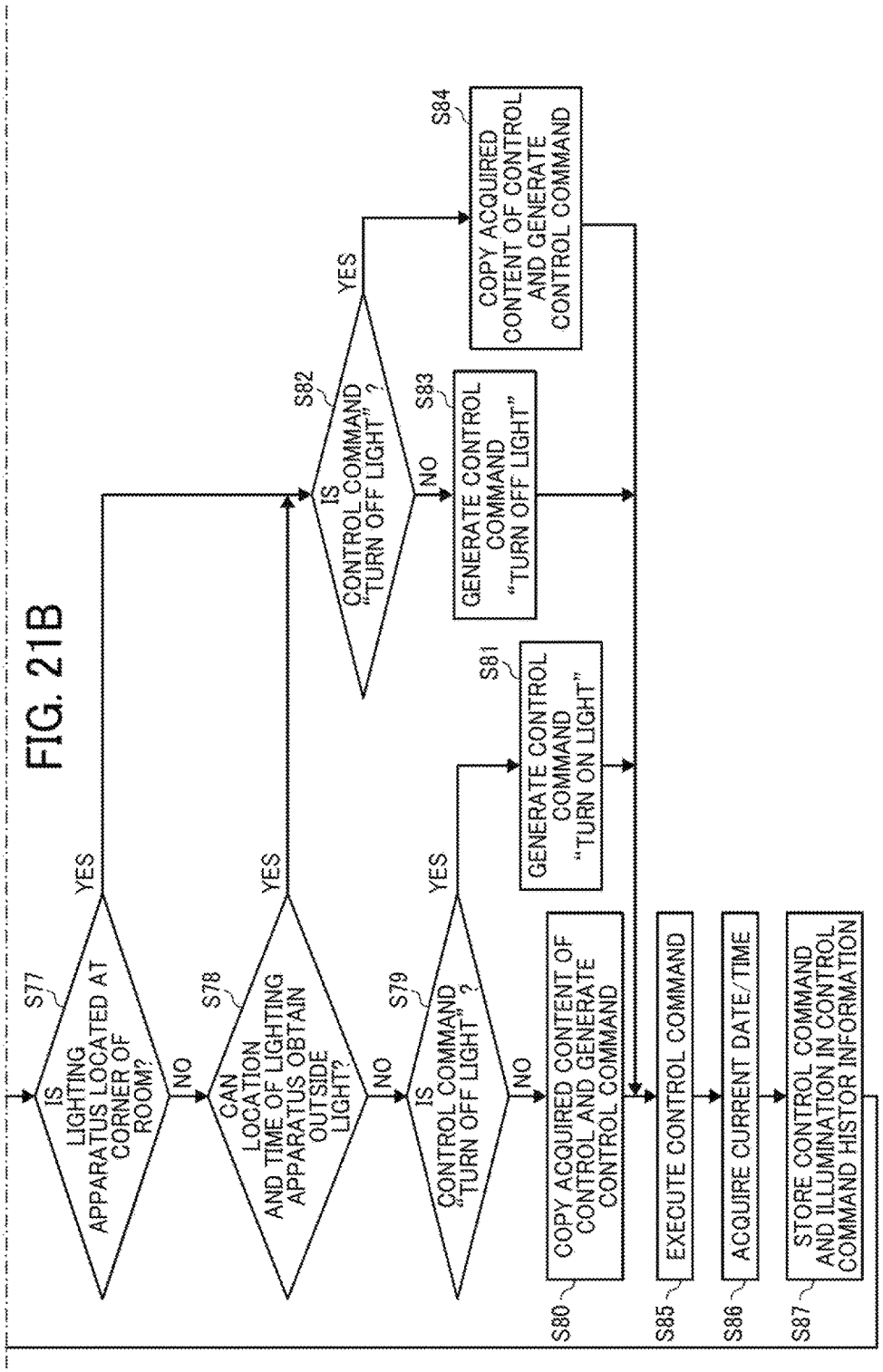

FIGS. 21A and 21B are flowcharts illustrating an operation of generating the control command performed by the electric apparatus in this embodiment. Just like the operation in steps S11 to S13 in FIG. 9 in the first embodiment, it is determined whether or not the control command is received from starting keeping time by the time when the predetermined period of time (communication failure detection time) elapses in S71 to S73.

If the predetermined period of time elapses without receiving the control command (YES in S72), the control command generator 26 acquires the current date/time from the timer 27 in S74 and acquires the apparatus location information 244 from the storing unit 24 in S75. In addition, the control command generator 26 acquires the control command received around the same time a week ago from the time when the communication failure occurs from the control command history information 242 in S76.

After that, with reference to the apparatus layout information 243 in the storing unit 24, the control command generator 26 determines whether or not the lighting apparatus 20A itself is located at the corner of the room in S77. This is because an effect of lighting if the lighting apparatus 20A is located at the corner of the room is lower compared to a case the lighting apparatus 20A is located around a center of the room. In addition, in some cases, the lighting apparatus 20A is located at not only the corner but also around the center of the room. In that case, there is no problem even if the lighting apparatus 20A located at the corner is turned off. As a result, if the lighting apparatus 20A is located at the corner of the room, it is premised that the lighting apparatus 20A is turned off. It should be noted that, if people always stay even in case of the corner of the room, this operation may be omitted.

If the lighting apparatus 20A itself is not located at the corner of the room (NO in S77), based on the apparatus layout information 243 in the storing unit 24 and the current date/time acquired in S74, the control command generator 26 determines whether or not the lighting apparatus 20A itself is located at the position where the outside light may be obtained at that time in S78. For example, this operation is performed by determining whether or not the lighting apparatus 20A is located at a position whose distance from a window on the apparatus layout information 243 is within a predetermined range and the current time is within a predetermined time range (e.g., 8 AM to 4 PM etc.). This operation determines whether or not it is unnecessary to turn on the lighting apparatus 20A depending on the location of the lighting apparatus 20A and time at that point.

If the lighting apparatus 20A itself is not located at a position where the outside light may be obtained or it is impossible to obtain the outside light at that time (NO in S78), the control command generator 26 determines whether or not the acquire control command instructs to turn off the light in S79. If the acquired control command does not instruct to turn off the light but turn on the light (NO in S79), the acquired content of control is copied, and the control command is generated in S80. If the acquired control command instructs to turn off the light (YES in S79), the control command that instructs to turn on the light is generated in S81. For example, a control command that instructs to turn on the light at a predetermined lighting control level may be generated preliminarily and used in this case.

If the lighting apparatus 20A itself is located at the position where the outside light may be obtained at that time (YES in S78) or the lighting apparatus 20A itself is located at the corner of the room (YES in S77), the control command generator 26 determines whether or not the acquired control command instructs to turn off the light in S82. If the acquired control command does not instruct to turn off the light but turn on the light (NO in S82), the acquired content of control is copied, and the control command that instructs to turn off the light is generated in S83. For example, a control command that instructs to turn off the light may be generated preliminarily and used in this case. If the acquired control command requests to turn off the light (YES in S82), the control command generator 26 copies the content of the acquired control command and generates the control command in S84.

The control command generated in S80, S81, or S84 is passed to the control processor 22. Subsequently, the control processor 22 executes the received control command in S85. In addition, the control processor 22 acquires current date/time from the timer 27 in S86 and stores the acquired control command in the control command history information 242 along with the acquired current date/time in S87. Subsequently, the operation goes back to S71.

It should be noted, in case of not determining whether or not the lighting apparatus 20A itself may not obtain the outside light at that time, the timer 27 may be omitted. In this case, the operations of acquiring date/time in S74 and S86 are omitted, and the current date/time is not stored in storing the control command in S76 and S87.

In the fourth embodiment, each lighting apparatus 20A stores the apparatus location information 244 that indicates the location of the lighting apparatus 20A and the apparatus layout information 243. If the communication failure occurs, the apparatus location on the apparatus layout information 243 is acquired. As a result, depending on the location of the lighting apparatus 20A, the control command instructing to turn off the light around the same time a week ago may be modified to the control command instructing to turn on the light. By contrast, the control command instructing to turn on the light around the same time a week ago may be modified to the control command instructing to turn off the light For example, an effect of lighting if the lighting apparatus 20A is located at the corner of the room is lower compared to a case the lighting apparatus 20A is located around a center of the room. Therefore, the control command that instructs to turn off the light may be generated in this case. If the outside light may be obtained at that location, in some cases, enough illumination may be obtained instead of turning on the light. In that case, the control command that instructs to turn off the light may be generated.

Furthermore, each lighting apparatus 20A includes the timer 27 for acquiring current date/time. As a result, if the communication failure occurs, in case the lighting apparatus 20A is located at the position where the outside light may be obtained at that time zone, the control command that instructs to turn off the light may be generated. If the outside light may not be obtained at that time zone, the control command that instructs to turn on the light may be generated. That is, the lighting apparatus 20A may be controlled considering the location where the outside light may be obtained in addition to the time zone.

Embodiment 5

In this embodiment, information on whether or not people exist within a range of lighting for each lighting apparatus is further stored, and a case, if the communication failure occurs, that generates the control command using the past control commands and the information on whether or not the people exist is described below.

Figure 22:
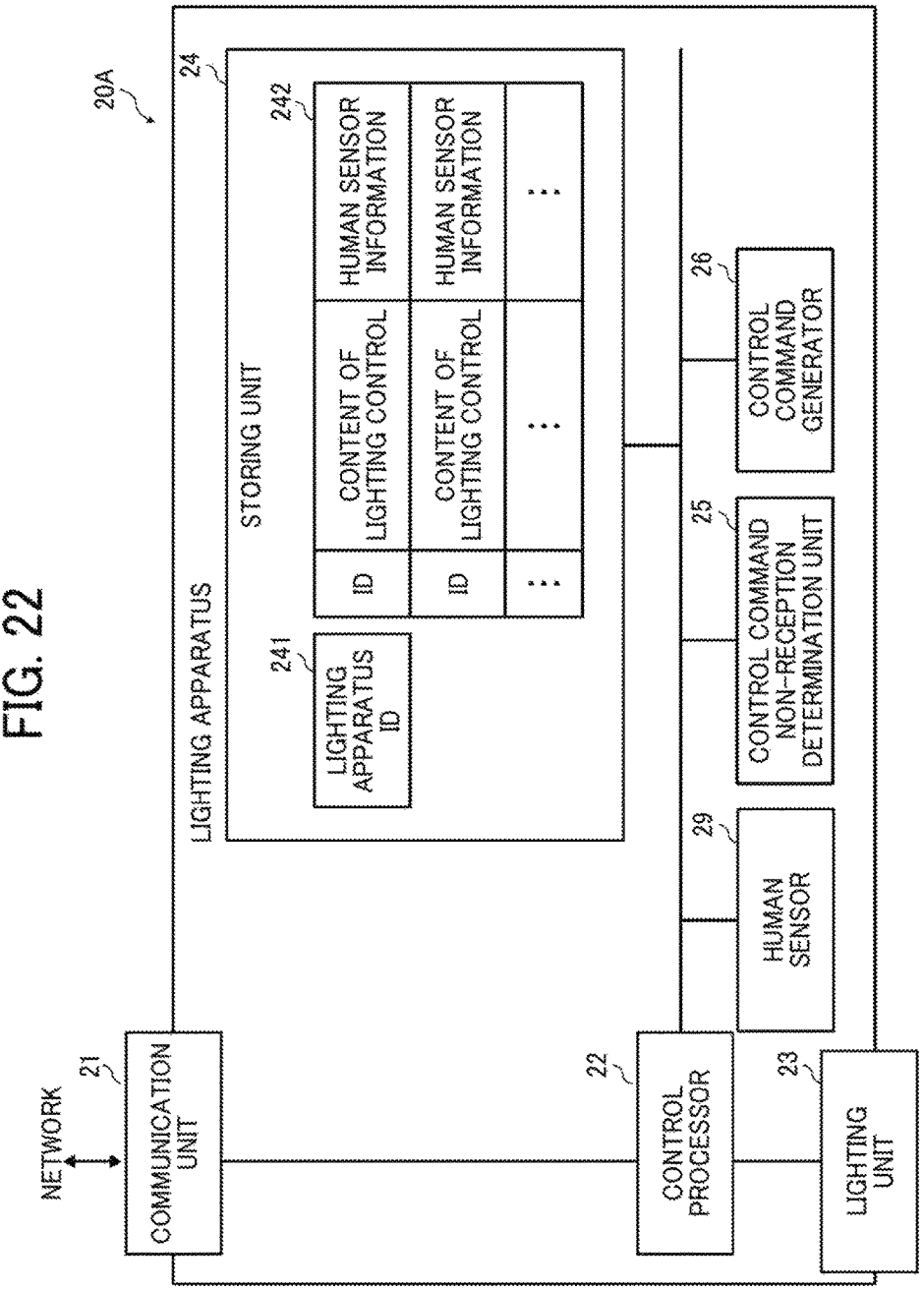
FIG. 22 is a block diagram schematically illustrating a functional configuration of a lighting apparatus as an embodiment of the present invention.

FIG. 22 is a block diagram schematically illustrating a functional configuration of the lighting apparatus in this embodiment. The lighting apparatus 20A further includes a human sensor 29 in addition to the configuration of the lighting apparatus 20A in the first embodiment. The human sensor 29 detects whether or not people exist within a predetermined range with a central focus on the position where the lighting apparatus 20A is located and passes the detection result to the control processor 22. A pyroelectric sensor and ultrasonic sensor etc. may be used for the human sensor 29 as an example.

Figure 23:
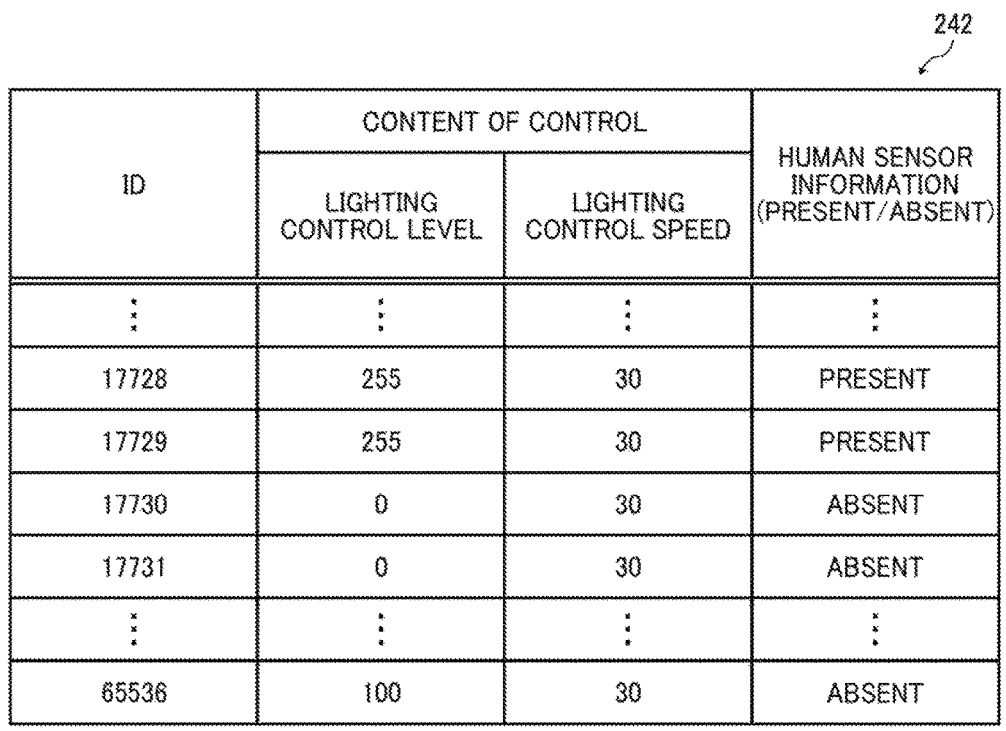
FIG. 23 is a diagram illustrating control command history information as an embodiment of the present invention.

After receiving the control command, the control processor 22 acquires information on whether or not people exist at that time from the human sensor 29, adds an ID to the control command, and stores human sensor information indicating whether or not people exist along with the control command in the control command history information 242 in the storing unit 24. FIG. 23 is a diagram illustrating control command history information in this embodiment. As illustrated in FIG. 23, by comparison with the first embodiment, each record includes the information on whether or not people exist at the time when the control command is received.

If the communication failure occurs, the control command generator 26 acquires the control command and human sensor information received around the same time a week ago from the current date/time from the control command history information 242. If the acquired control command requests to turn on the light and the acquired human sensor information indicates "present", the control command generator 26 copies the content of the acquired control command and generates the control command. If the acquired control command requests to turn on the light and the acquired human sensor information indicates "absent", the control command generator 26 generates the control command that instructs to turn off the light. In this case, for example, a control command generated preliminarily whose lighting control level is minimum (0) and lighting control speed is 30 may be used. If the acquired control command requests to turn off the light and the human sensor information indicates "absent", the control command generator 26 copies the content of the acquired control command and generates the control command. If the acquired control command requests to turn off the light and the human sensor information indicates "present", the control command generator 26 generates the control command that instructs to turn on the light. In this case, for example, a control command generated preliminarily whose lighting control level is maximum (255) and lighting control speed is 30 may be used.

In the below description, it should be noted that the same symbol is assigned to the same component as the first embodiment, and descriptions for those components are omitted.

Figure 24B:
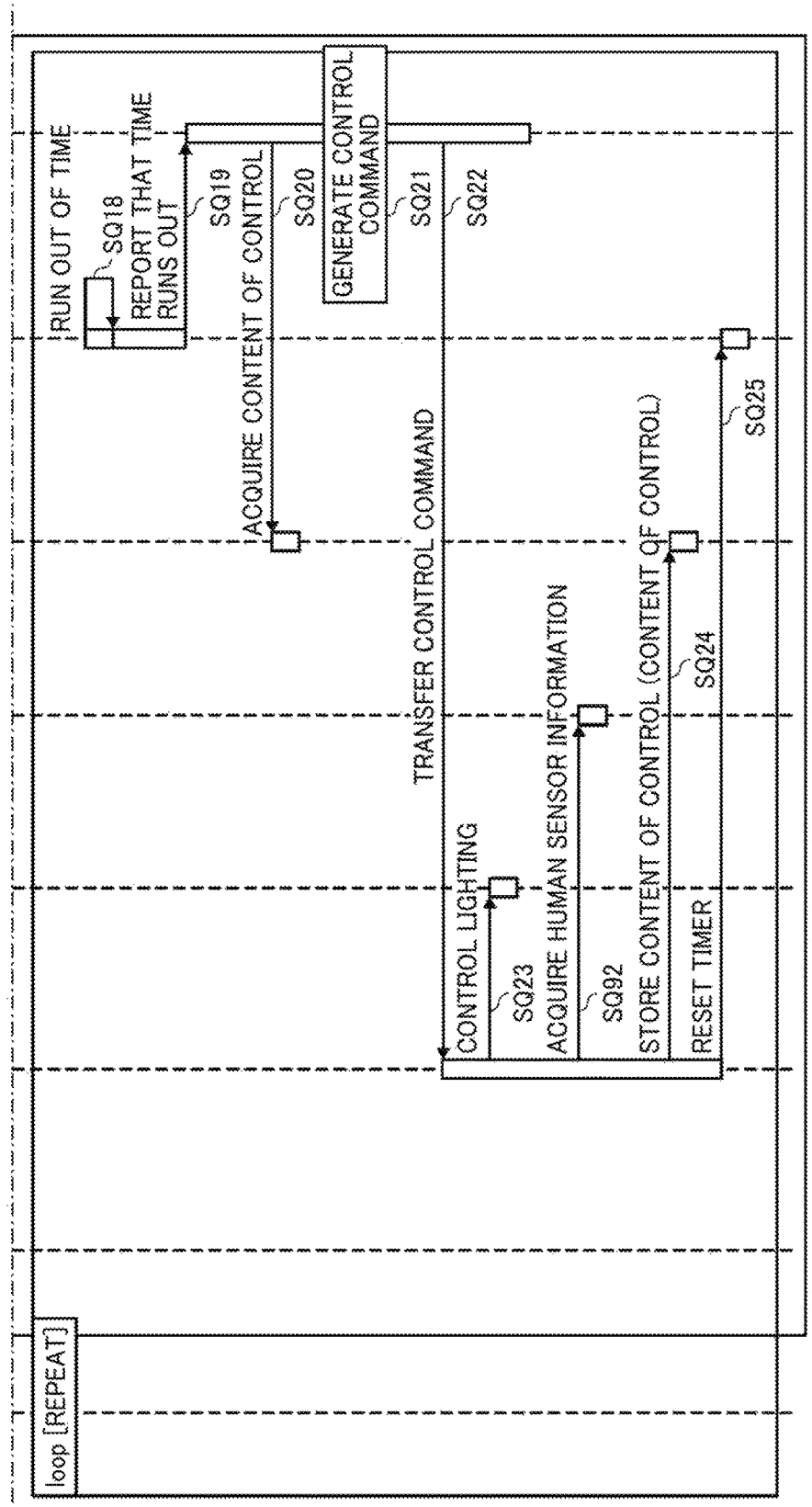

Next, an operation of the electric apparatus control system 1 as described above is described below. FIGS. 24A and 24B are sequence diagrams illustrating an operation performed by the electric apparatus controlling system in this embodiment. Here, points different from the first embodiment illustrated in FIGS. 8A and 8 are described below.

In the normal mode, between SQ13 and SQ14, an operation that the control processor 22 acquires the human sensor information from the human sensor 29 is performed in SQ91. It should be noted that, in storing the content of control in SQ14, the control processor 22 adds the human sensor information to the received content of control and stores the data in the control command history information 242.

In the control command generation mode, between SQ23 and SQ24, an operation that the control processor 22 acquires human sensor information from the human sensor 29 is performed in SQ92. It should be noted that, in storing the content of control in SQ24, the control processor 22 adds the human sensor information to the received content of control and stores the data in the control command history information 242. The operation of generating the control command in SQ21 is described below.

Figure 25B:
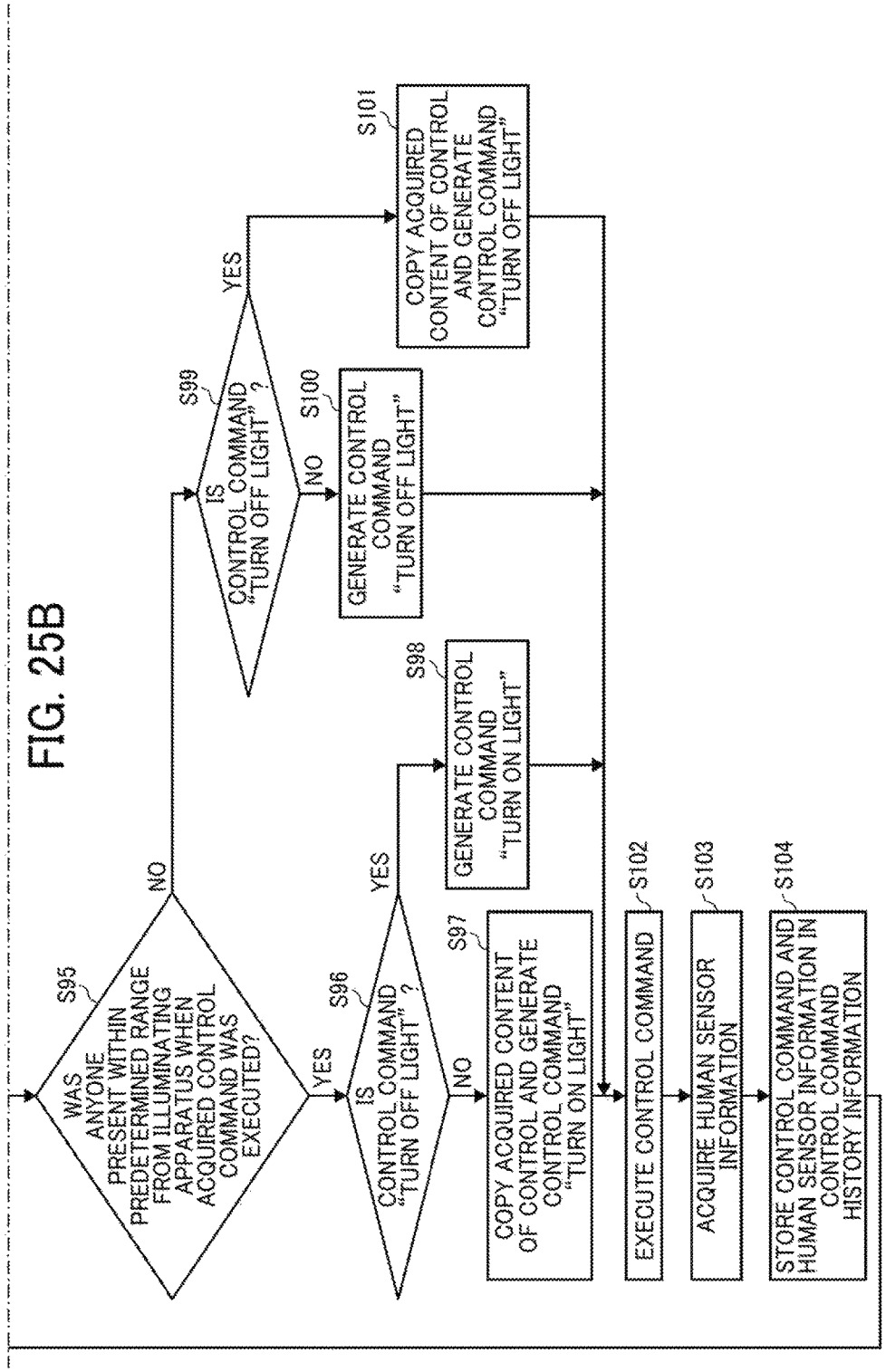

FIGS. 25A and 25B are flowcharts illustrating an operation of generating the control command performed by the electric apparatus in this embodiment. Just like the operation in steps S11 to S13 in FIG. 9 in the first embodiment, it is determined whether or not the control command is received from starting keeping time by the time when the predetermined period of time (communication failure detection time) elapses in S91 to S93.

If the predetermined period of time elapses instead of receiving the control command (YES in S92), the control command generator 26 acquires the control command and human sensor information received around the same time a week ago from the time when the communication failure occurs from the control command history information 242 in S94. Subsequently, in executing the acquired control command, the control command generator 26 determines whether or not people exist within the predetermined range around the lighting apparatus 20A to be instructed in S95.

If someone exist (YES in S95), the control command generator 26 determines whether or not the acquired control command instructs to turn off the light in S96. If the acquired control command does not instruct to turn off the light but turn on the light (NO in S96), the content of the acquired control command is copied, and the control command that instructs to turn on the light is generated in S97.

If the acquired control command instructs to turn off the light (YES in S96), the control command that instructs to turn on the light is generated in S98. For example, a control command that instructs to turn on the light at a predetermined lighting control level and lighting control speed may be generated preliminarily and used in this case.

By contrast, if someone does not exists within the predetermined range (NO in S95), the control command generator 26 determines whether or not the acquired control command instructs to turn off the light in S99. If the acquired control command does not instruct to turn off the light (NO in S99), the control command that instructs to turn off the light is generated in S100. For example, a control command that instructs to turn off the light may be generated preliminarily and used in this case.

If the acquired control command instructs to turn off the light (YES in S99), the control command generator 26 copies the content of the acquired control command and generates the control command that instructs to turn off the light in S101.

The control command generated in S97, S98, S100, or S101 is passed to the control processor 22. Subsequently, the control processor 22 executes the received control command in S102. In addition, the control processor 22 acquires the human sensor information at that time from the human sensor 29 in S103 and stores the human sensor information along with the received control command in the control command history information 242 in S104. Subsequently, the operation goes back to S91.

It should be noted that, in the above description, the control command that instructs to turn off the light or turn on the light is generated using the information stored in the control command history information 242 indicating whether or not someone exist. In a factory etc. for example, almost the same operation is performed in most cases around the same time on the same weekday. Therefore, data in the past may be applied in those cases. However, if the past data described above cannot be applied, the control command may be generated based on the information indicating whether or not someone exist provided by the human sensor 29 at the time of generating the control command.

In the fifth embodiment, the human sensor 29 is included and the information indicating whether or not someone exist at the time of receiving the control command is also stored. As a result, if the communication failure occurs, even if the control command around the same time a week ago instructs to turn off the light, in accordance with the information indicating whether or not someone exist, the lighting apparatus 20A may be kept turned off or may be turned on. That is, the lighting apparatus 20A is turned on or turned off depending on the information indicating whether or not someone exist. Therefore, the lighting apparatus 20A located at a position where no one exists may be prevented from being turned on, reducing waste of energy consumption.

It should be noted that the configurations described in the first embodiment to the fifth embodiment may be combined and used. In the above description, the case that the network 50 is implemented by using the wireless LAN is described. However, the network 50 may be implemented by using other wireless communication standards. Furthermore, in the above description, the electric apparatus controlling server 10 and the electric apparatus 20 are connected to the same local network. However, embodiments described above are not limited to that implementation. For example, a local network that the electric apparatus controlling server 10 is not connected but the electric apparatus 20 is connected and the electric apparatus controlling server 10 are connected to a wide area network, and a wireless network exists on a communication path between the electric apparatus controlling server 10 and the electric apparatus 20.

In addition, in the above embodiments, the electric apparatus controlling server 10 is used. Furthermore, those configurations may be implemented using functions provided by network services such as a cloud service and Application Service Provider (ASP) etc. In addition, the electric apparatus controlling server 10 used in the network services may be implemented by using only a one case or may be distributed partially using the functions described in the embodiments above.

Furthermore, if the electric apparatus 20 is connected via the wired LAN, not the format illustrated in FIG. 5 but a format compatible with a standard for a data link layer used in that local area network (LAN) is used.

The system configuration described above that the electric apparatus 20 and the electric apparatus controlling server 10 are connected is just an example, and various system configurations may be used in accordance with an intended application or purpose.

Figure 26:
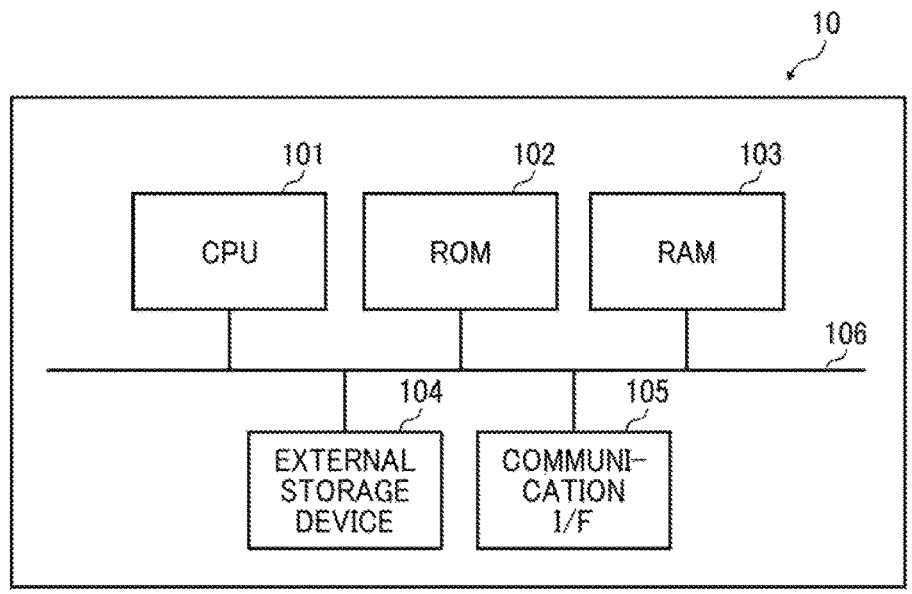
FIG. 26 is a block diagram schematically illustrating a hardware configuration of an electric apparatus controlling server as an embodiment of the present invention.

FIG. 26 is a block diagram schematically illustrating a hardware configuration of an electric apparatus controlling server in this embodiment. The electric apparatus controlling server 10 includes a hardware configuration using a generic computer that a central processing unit (CPU) 101, a read only memory (ROM) 102, a random access memory (RAM) 103, an external storage device 104, and a communication I/F 105 are connected with each other via a bus 106.

The CPU 101 controls the entire electric apparatus controlling server 10. The ROM 102 is a nonvolatile memory that can store data while the power supply of the electric apparatus controlling server 10 is shut down and stores programs executed by the CPU 101 and other fixed data etc. The RAM 103 is a volatile memory that stores control commands etc. temporarily. The external storage device 104 stores the control recipe and programs executed by the CPU 101 etc. For example, a hard disk drive (HDD) or solid state drive (SSD) may be used as the external storage device 104. The communication I/F 105 exchanges data and signals with the electric apparatus 20.

It should be noted that the functions of the control command generator 12 in FIG. 2 are implemented by executing programs that each operation is described by the CPU 101 for example.

Figure 27:
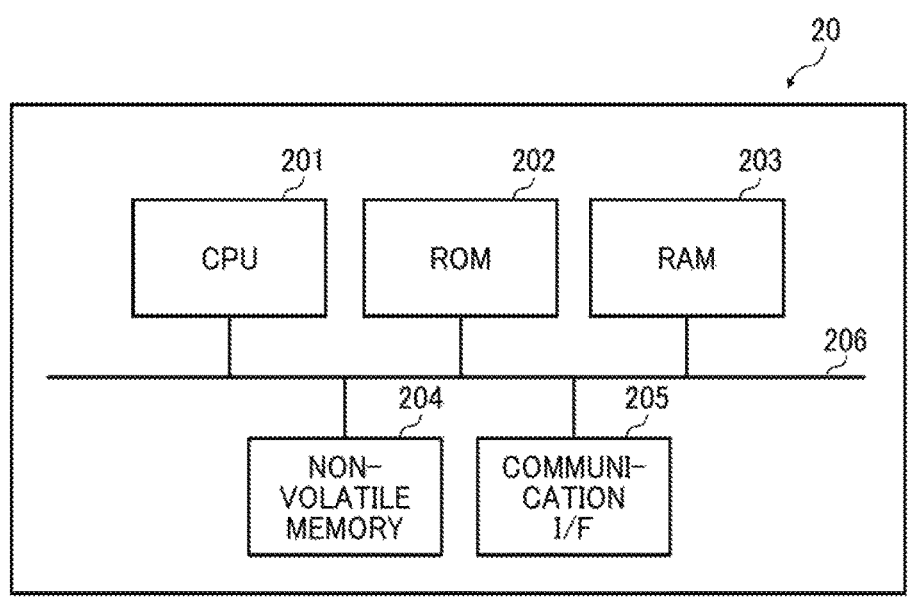
FIG. 27 is a block diagram schematically illustrating a hardware configuration of a controller in an electric apparatus as an embodiment of the present invention.

FIG. 27 is a block diagram schematically illustrating a hardware configuration of a controller in an electric apparatus in this embodiment. The controller in the electric apparatus 20 in this embodiment includes a configuration that a CPU 201, a ROM 202, a RAM 203, a nonvolatile memory 204, and a communication I/F 205 are connected with each other via a bus 206. The CPU 201 controls the entire electric apparatus 20. The ROM 202 is a nonvolatile memory that can store data while the power supply of the electric apparatus 20 is shut down and stores programs executed by the CPU 201 and other fixed data etc. The RAM 203 is a volatile memory that stores control commands etc. temporarily. The nonvolatile memory 204 stores the lighting apparatus ID, the control command history information, the apparatus location information, and the apparatus layout information etc. For example, a NAND type flash memory or electrically erasable programmable read-only memory (EEPROM) may be used as the nonvolatile memory 204. The communication I/F 205 exchanges signals with the lighting unit and exchanges data and signals with the electric apparatus controlling server 10.

The electric apparatus controlling program executed by the electric apparatus 20 in this embodiment may be provided by being stored in a computer readable, recording medium, such as a compact disc read only memory (CD-ROM), a flexible disk (FD), a compact disc recordable (CD-R), and a digital versatile disc (DVD) etc., in a file format installable or executable.

In addition, the electric apparatus controlling program executed by the electric apparatus 20 in this embodiment may be stored in a computer connected to a network such as the Internet etc., and the electric apparatus controlling program may be provided by downloading the program via the network. Furthermore, the electric apparatus controlling program executed by the electric apparatus 20 in this embodiment may be provided and distributed via the network such as the Internet etc.

In addition, the electric apparatus controlling program executed by the electric apparatus 20 in this embodiment may be provided by storing the electric apparatus controlling program executed by the electric apparatus 20 in this embodiment in the ROM etc. preliminarily.

In the system that the electric apparatus and the server are connected with each other via the network, the embodiments described above provides the electric apparatus that can be controlled keeping being performed even if the communication failure occurs between the electric apparatus and the server.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An electric apparatus, comprising:
an electric device to perform an operation using a supplied electric power;
a receiver to receive one or more control commands for controlling the electric device from a server via a network;
a memory to store control command history information including a content of the one or more control commands received by the server; and
circuitry to:
measure a predetermined period of time;
determine whether or not a control command is received by the receiver from the server within the predetermined period of time;
when the circuitry determines that the predetermined period of time has elapsed without reception of the control command by the receiver:
generate, another control command using the content stored in the control command history information; and
control the electric device based on the other control command; and
when the circuitry determines that the control command is received by the receiver within the predetermined period of time;
restart measurement of the predetermined period of time; and
repeat the determination of determine whether or not the control command is received by the receiver from the server within the predetermined period of time.

2. The electric apparatus according to claim 1, wherein the receiver repeatedly receives the control command from the server at a predetermined interval,
when the receiver receives the control command, the circuitry further:
stores the control command in the control command history information so that an order of receiving the control command is identifiable;
acquires, among the control command history information, the content of the control commands for a predetermined number of control commands counted from a time when the control command is not received for the predetermined period of time; and
generates the other control command by copying the content of the control command stored in the control command history.

3. The electric apparatus according to claim 1, further comprising a timer, wherein
the circuitry further:
controls the timer to acquire a reception date and time, when the control command is received by the receiver, from the timer and stores the control command added with the date and time in the control command history information;
acquires the content of the control command from the control command history information at a same time of a same day in a previous week when the circuitry determines that the control command is not received within the predetermined period of time; and generates the other control command from the acquired content.

4. The electric apparatus according to claim 1, wherein the memory further stores apparatus layout information indicating a layout in an area where the electric apparatus is located and apparatus location information indicating a location where the electric apparatus is located in the apparatus layout information, and the circuitry modifies the control command being acquired from the control command history information based on the apparatus location information to generate the other control command.

5. The electric apparatus according to claim 1, further comprising a sensor that detects whether or not a human is within a predetermined range of the electric device, the predetermined range including a location where the electric apparatus is located, wherein the circuitry further:
acquires sensor information, from the sensor, indicating whether or not the human is within the predetermined range when the control command is received by the receiver;
stores the control command in the control command history information added with the sensor information; and
modifies the control command being acquired from the control command history information based on the sensor information to generate the other control command.

6. The electric apparatus according to claim 1, further comprising a sensor that detects an illumination intensity at a location where the electric apparatus is located, wherein
the electric device is a light source, and
the circuitry further:
acquires the illumination intensity when the control command is received from the sensor;
stores the control command in the control command history information added with the illumination intensity; and
modifies the control command being acquired from the control command history information based on the illumination intensity to generate the other control command.

7. A method of controlling an electric apparatus, the method comprising:
storing, in a memory, control command history information including content of one or more control commands for controlling an electric device, the one or more control commands being received from a server;
measuring a predetermined period of time;
determining whether or not a first control command is received from the server within the predetermined period of time;
when the predetermined period of time has elapsed without reception of the first control command by the electric apparatus:
generating, a second control command using the content stored in the control command history information; and
controlling the electric device in accordance with the second control command; and
when the first control command is received by the electric apparatus during the predetermined period of time:
restarting measurement of the predetermined period of time; and
repeating the determining to determine whether or not another control command is received by the receiver from the server within the predetermined period of time.

8. A non-transitory, computer-readable recording medium storing a program that, when executed by one or more processors of an image processing apparatus, causes the processors to implement a process of controlling an electric apparatus, the process comprising:
storing, in a memory, control command history information including a content of one or more control commands for controlling an electric device, the one or more control commands being received from a server;
measuring a predetermined period of time;
determining whether or not a first control command is received from the server within the predetermined period of time;
when the predetermined period of time has elapsed without reception of the first control command by the electric apparatus:
generating, a second control command using the content stored in the control command history information; and
controlling the electric device in accordance with the second control command; and
when the first control command is received by the electric apparatus during the predetermined period of time:
restarting measurement of the predetermined period of time; and
repeating the determining to determine whether or not another control command is received by the receiver from the server within the predetermined period of time.

* * * * *